US012695898B2

(12) United States Patent
Deng et al.

(10) Patent No.: US 12,695,898 B2
(45) Date of Patent: Jul. 28, 2026

(54) ON BOUNDARY PADDING MOTION VECTOR CLIPPING IN IMAGE/VIDEO CODING

(71) Applicants:Beijing Bytedance Network Technology Co., Ltd., Beijing (CN); Bytedance Inc., Los Angeles, CA (US)

(72) Inventors: Zhipin Deng, Beijing (CN); Kai Zhang, San Diego, CA (US); Li Zhang, San Diego, CA (US); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/452,331

(22) Filed: Aug. 18, 2023

(65) Prior Publication Data

US 2023/0396792 A1     Dec. 7, 2023

Related U.S. Application Data

(63) Continuation of application No. PCT/CN2022/076615, filed on Feb. 17, 2022.

(30) Foreign Application Priority Data

Feb. 20, 2021     (WO) ................ PCT/CN2021/077044

(51) Int. Cl.
*H04N 19/513*          (2014.01)
*H04N 19/132*          (2014.01)
*H04N 19/176*          (2014.01)

(52) U.S. Cl.
CPC ......... *H04N 19/513* (2014.11); *H04N 19/132* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2019/0082184 A1* | 3/2019 | Hannuksela | ........... H04N 13/15 |
| 2020/0177911 A1 | 6/2020 | Aono | |
| 2021/0029353 A1* | 1/2021 | Brandenburg | ....... H04N 19/597 |

FOREIGN PATENT DOCUMENTS

| | | |
|---|---|---|
| TW | 202038627 A | 10/2020 |

OTHER PUBLICATIONS

Document: JVET-J0021, Chen, Y., et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11 10th Meeting: San Diego, US, Apr. 10-20, 2018, 43 pages.

(Continued)

*Primary Examiner* — Christopher G Findley
(74) *Attorney, Agent, or Firm* — Conley Rose, P.C.

(57)          ABSTRACT

A method for coding video data implemented by a video coding apparatus. The method includes clipping a motion vector of a padding sample to be within a motion vector range, wherein the motion vector range is based on a maximum padding dimension of an extended area around a video unit of a video; and converting between the video unit of the video and a bitstream in accordance with the motion vector as constrained.

20 Claims, 11 Drawing Sheets

600

Clip a motion vector of a padding sample to be within a motion vector range, where the motion vector range is based on a maximum padding dimension of an extended area around a video unit of a video ⟍ 602

Convert between the video unit of the video and a bitstream in accordance with the motion vector as constrained ⟍ 604

(56) References Cited

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2(in force edition), Feb. 2018, 692 pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Document: JVET-Q2002-v1, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 92 pages.

VTM software: Retrieved from the Internet: https://vcgit.hhi.fraunhofer.de/jvet/VVCSoftware_VTM.git, Oct. 18, 2022, 3 pages.

Document: JVET-L0223-v3, Brandenburg, J., et al., "CE4.6: Intra and Inter/Intra Boundary Padding," Joint Video Experts Team (JVET) of ITU-T SG 16 WP 3 and ISO/[EC JTC I/SC 29/WG 11, 12th Meeting: Macao, CN, Oct. 3-12, 2018, 4 pages.

International Search Report from PCT Application No. PCT/CN2022/076615 dated May 7, 2022, 10 pages.

* cited by examiner

600

Clip a motion vector of a padding sample to be within a motion vector range, where the motion vector range is based on a maximum padding dimension of an extended area around a video unit of a video        602

Convert between the video unit of the video and a bitstream in accordance with the motion vector as constrained        604

700

900

ON BOUNDARY PADDING MOTION VECTOR CLIPPING IN IMAGE/VIDEO CODING

CROSS-REFERENCE TO RELATED APPLICATIONS

This application is a continuation of International Application No. PCT/CN2022/076615 filed on Feb. 17, 2022, which claims the priority to and benefits of International Application No. PCT/CN2021/077044 filed on Feb. 20, 2021. All the aforementioned patent applications are hereby incorporated by reference in their entireties.

TECHNICAL FIELD

The present disclosure is generally related to video coding and, in particular, to inter prediction in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments clip a motion vector of a padding sample to be within a motion vector range. The motion vector range is based on a maximum padding dimension of an extended area around a video unit of a video. Clipping the motion vector ensures that the motion vector points to a sample within the extended area. Thus, video coding is improved relative to existing techniques.

A first aspect relates to a method for coding video data implemented by a video coding apparatus. The method includes clipping a motion vector of a padding sample to be within a motion vector range, wherein the motion vector range is based on a maximum padding dimension of an extended area around a video unit of a video; and converting between the video unit of the video and a bitstream in accordance with the motion vector as constrained.

Optionally, in any of the preceding aspects, another implementation of the aspect provides that the motion vector as clipped identifies a reference sample in a reference video unit, and wherein the reference sample is constrained to being within the extended area.

Optionally, in any of the preceding aspects, another implementation of the aspect provides that the video unit and the extended area collectively form a larger video unit, and wherein a size of the larger video unit is dependent upon a size of the video unit, a vertical padding dimension of the extended area, and a horizontal padding dimension of the extended area.

Optionally, in any of the preceding aspects, another implementation of the aspect provides that a portion of the extended area is filled with padding samples generated by inter prediction, intra prediction, or intra block copy (IBC), and wherein another portion of the extended area is filled with the padding samples generated by duplication or repetition of reconstructed samples within the video unit or the padding samples within the extended area.

Optionally, in any of the preceding aspects, another implementation of the aspect provides that all motion vectors, including the motion vector as clipped, are constrained to being within the extended area.

Optionally, in any of the preceding aspects, another implementation of the aspect provides that an innermost portion of the extended area proximate the video unit is filled with padding samples according to a first padding method, and wherein an outermost portion of the extended area outside the innermost area is filled with the padding samples according to a second padding method different that the first padding method.

Optionally, in any of the preceding aspects, another implementation of the aspect provides that the second padding method always generates the padding samples by duplicate padding or repetitive padding regardless of whether the second method generates the padding samples by inter prediction, intra prediction, or intra block copy (IBC).

Optionally, in any of the preceding aspects, another implementation of the aspect provides that padding samples in the outermost portion of the extended area are always filled using duplicate padding or repetitive padding.

Optionally, in any of the preceding aspects, another implementation of the aspect provides that a padding dimension of the extended area is greater than a threshold, and wherein the threshold is based on an interpolation filter length, a maximum allowed coding unit size, or a coding tree unit size.

Optionally, in any of the preceding aspects, another implementation of the aspect provides that the extended area is filled on a unit by unit basis, wherein each unit used for the unit by unit basis has a size of M×N, and wherein M and N represent two or more luma samples.

Optionally, in any of the preceding aspects, another implementation of the aspect provides that the extended area is filled on a unit by unit basis, wherein each unit used for the unit by unit basis has a minimum size of M×N, and wherein M and N represent two or four luma samples.

Optionally, in any of the preceding aspects, another implementation of the aspect provides that a predicted sample from the video unit is used to generate the padding sample, and wherein the padding sample is disposed in the extended area of the video unit.

Optionally, in any of the preceding aspects, another implementation of the aspect provides that the extended area of the video unit is filled with padding samples including the padding sample, and wherein only predicted samples from the video unit are used to generate the padding samples.

Optionally, in any of the preceding aspects, another implementation of the aspect provides that predicted samples within the extended area are prohibited from being used to generate padding samples, including the padding sample, of the video unit.

Optionally, in any of the preceding aspects, another implementation of the aspect provides that whether predicted samples from a reference video unit are used to construct padding samples, including the padding sample, in the extended area of the video unit depends on a value of a motion vector of sample in the video unit.

Optionally, in any of the preceding aspects, another implementation of the aspect provides that the motion vector is a vertical motion vector, and wherein, when padding a top boundary of the video unit, whether there is a reference padding sample available in a reference video unit depends on whether or not the vertical motion vector is positive.

Optionally, in any of the preceding aspects, another implementation of the aspect provides that the motion vector is a vertical motion vector, and wherein, when padding a bottom boundary of the video unit, whether there is a reference padding sample available in a reference video unit depends on whether or not the vertical motion vector is negative.

Optionally, in any of the preceding aspects, another implementation of the aspect provides that the motion vector is a horizontal motion vector, and wherein, when padding a left boundary of the video unit, whether there is a reference padding sample available in a reference video unit depends on whether or not the horizontal motion vector is positive.

Optionally, in any of the preceding aspects, another implementation of the aspect provides that the motion vector is a horizontal motion vector, and wherein, when padding a right boundary of the video unit, whether there is a reference padding sample available in a reference video unit depends on whether or not the horizontal motion vector is negative.

A second aspect relates to an apparatus for coding video data comprising a processor and a non-transitory memory with instructions thereon, wherein the instructions upon execution by the processor cause the processor to perform any of the methods disclosed herein.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to perform any of the methods disclosed herein.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard, also known as H.266, targeting a fifty percent (50%) bitrate reduction compared to HEVC. The first version of VVC was finalized in July 2020.

H.266 terminology is used in some description only for ease of understanding and not for limiting scope of the disclosed techniques. As such, the techniques described herein are applicable to other video codec protocols and designs also. The ideas may be applied individually or in various combination, to any image/video coding standard or non-standard image/video codec, e.g., next-generation image/video coding standard.

Figure 1:
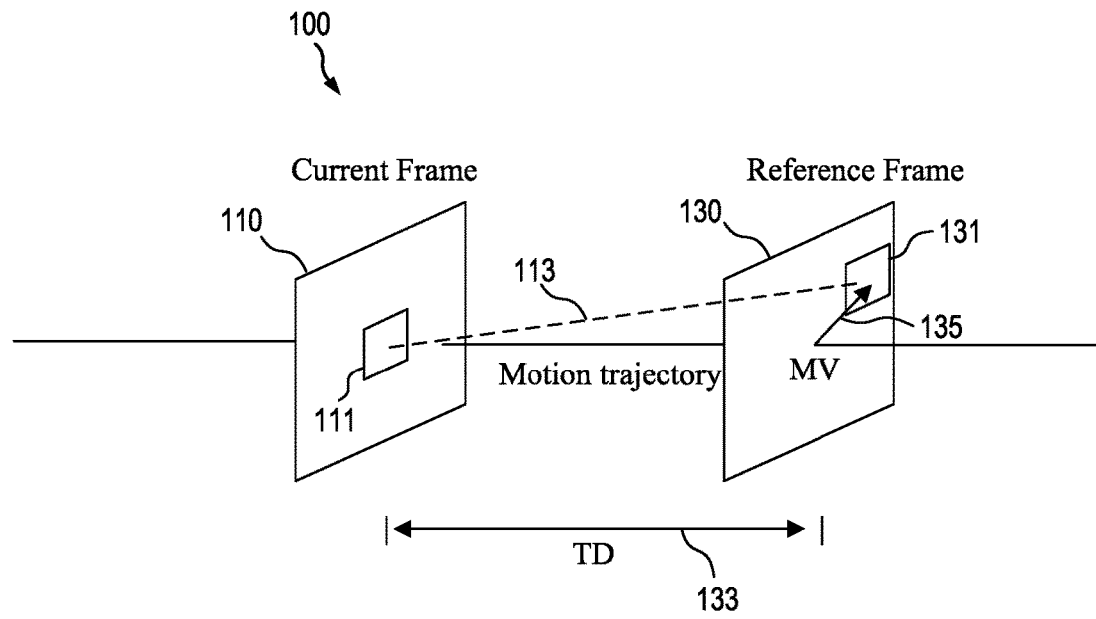
FIG. 1 is a schematic diagram illustrating an example of unidirectional inter prediction.

FIG. 1 is a schematic diagram illustrating an example of unidirectional inter prediction 100. Unidirectional inter prediction 100 can be employed to determine motion vectors for encoded and/or decoded blocks created when partitioning a picture.

Unidirectional inter prediction 100 employs a reference frame 130 with a reference block 131 to predict a current block 111 in a current frame 110. The reference frame 130 may be temporally positioned after the current frame 110 as shown (e.g., as a subsequent reference frame), but may also be temporally positioned before the current frame 110 (e.g., as a preceding reference frame) in some examples. The current frame 110 is an example frame/picture being encoded/decoded at a particular time. The current frame 110 contains an object in the current block 111 that matches an object in the reference block 131 of the reference frame 130. The reference frame 130 is a frame that is employed as a reference for encoding a current frame 110, and a reference block 131 is a block in the reference frame 130 that contains an object also contained in the current block 111 of the current frame 110.

The current block 111 is any coding unit that is being encoded/decoded at a specified point in the coding process. The current block 111 may be an entire partitioned block, or may be a sub-block when employing affine inter prediction mode. The current frame 110 is separated from the reference frame 130 by some temporal distance (TD) 133. The TD 133 indicates an amount of time between the current frame 110 and the reference frame 130 in a video sequence, and may be measured in units of frames. The prediction information for the current block 111 may reference the reference frame 130 and/or reference block 131 by a reference index indicating the direction and temporal distance between the frames. Over the time period represented by the TD 133, the object in the current block 111 moves from a position in the current frame 110 to another position in the reference frame 130 (e.g., the position of the reference block 131). For example, the object may move along a motion trajectory 113, which is a direction of movement of an object over time. A motion vector 135 describes the direction and magnitude of the movement of the object along the motion trajectory 113 over the TD 133. Accordingly, an encoded motion vector 135, a reference block 131, and a residual including the difference between the current block 111 and the reference block 131 provides information sufficient to reconstruct a current block 111 and position the current block 111 in the current frame 110.

Figure 2:
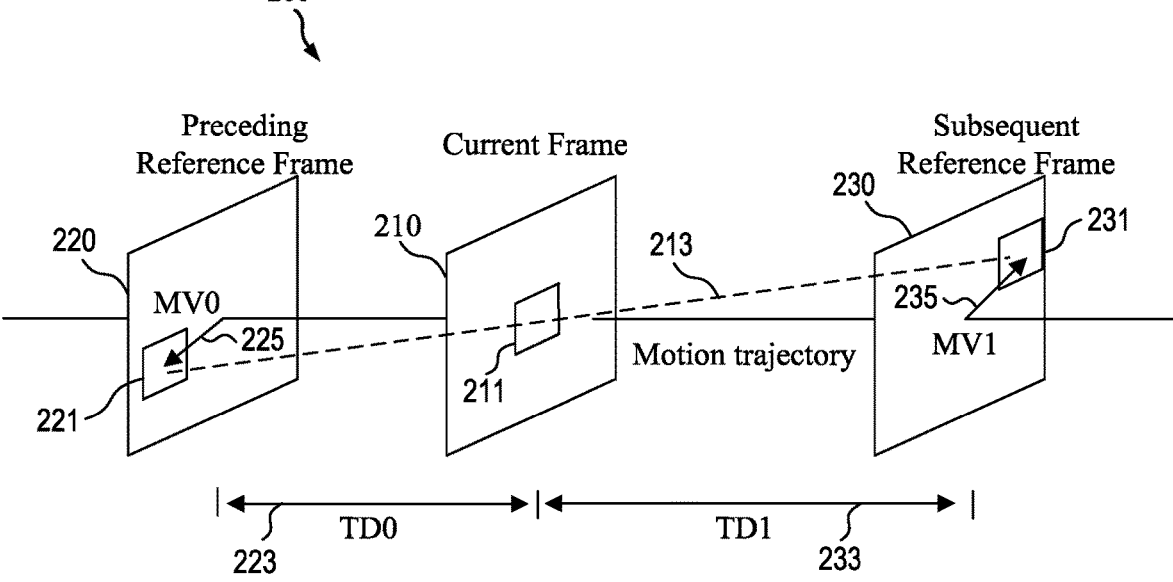
FIG. 2 is a schematic diagram illustrating an example of bidirectional inter prediction.

FIG. 2 is a schematic diagram illustrating an example of bidirectional inter prediction 200. Bidirectional inter prediction 200 can be employed to determine motion vectors for encoded and/or decoded blocks created when partitioning a picture.

Bidirectional inter prediction 200 is similar to unidirectional inter prediction 100, but employs a pair of reference frames to predict a current block 211 in a current frame 210. Hence current frame 210 and current block 211 are substantially similar to current frame 110 and current block 111, respectively. The current frame 210 is temporally positioned between a preceding reference frame 220, which occurs before the current frame 210 in the video sequence, and a subsequent reference frame 230, which occurs after the current frame 210 in the video sequence. Preceding reference frame 220 and subsequent reference frame 230 are otherwise substantially similar to reference frame 130.

The current block 211 is matched to a preceding reference block 221 in the preceding reference frame 220 and to a subsequent reference block 231 in the subsequent reference frame 230. Such a match indicates that, over the course of the video sequence, an object moves from a position at the preceding reference block 221 to a position at the subsequent reference block 231 along a motion trajectory 213 and via the current block 211. The current frame 210 is separated from the preceding reference frame 220 by some preceding temporal distance (TD0) 223 and separated from the subsequent reference frame 230 by some subsequent temporal distance (TD1) 233. The TD0 223 indicates an amount of time between the preceding reference frame 220 and the current frame 210 in the video sequence in units of frames. The TD1 233 indicates an amount of time between the current frame 210 and the subsequent reference frame 230 in the video sequence in units of frame. Hence, the object moves from the preceding reference block 221 to the current block 211 along the motion trajectory 213 over a time period indicated by TD0 223. The object also moves from the current block 211 to the subsequent reference block 231 along the motion trajectory 213 over a time period indicated by TD1 233. The prediction information for the current block 211 may reference the preceding reference frame 220 and/or preceding reference block 221 and the subsequent reference frame 230 and/or subsequent reference block 231 by a pair of reference indices indicating the direction and temporal distance between the frames.

A preceding motion vector (MV0) 225 describes the direction and magnitude of the movement of the object along the motion trajectory 213 over the TD0 223 (e.g., between the preceding reference frame 220 and the current frame 210). A subsequent motion vector (MV1) 235 describes the direction and magnitude of the movement of the object along the motion trajectory 213 over the TD1 233 (e.g., between the current frame 210 and the subsequent reference frame 230). As such, in bidirectional inter prediction 200, the current block 211 can be coded and reconstructed by employing the preceding reference block 221 and/or the subsequent reference block 231, MV0 225, and MV1 235.

In an embodiment, inter prediction and/or bi-directional inter prediction may be carried out on a sample-by-sample (e.g., pixel-by-pixel) basis instead of on a block-by-block basis. That is, a motion vector pointing to each sample in the preceding reference block 221 and/or the subsequent reference block 231 can be determined for each sample in the current block 211. In such embodiments, the motion vector 225 and the motion vector 235 depicted in FIG. 2 represent a plurality of motion vectors corresponding to the plurality of samples in the current block 211, the preceding reference block 221, and the subsequent reference block 231.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 100, bidirectional inter prediction 200, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 100 and/or bidirectional inter prediction 200, depending on which approach is used when such neighboring blocks are encoded.

Figure 3:
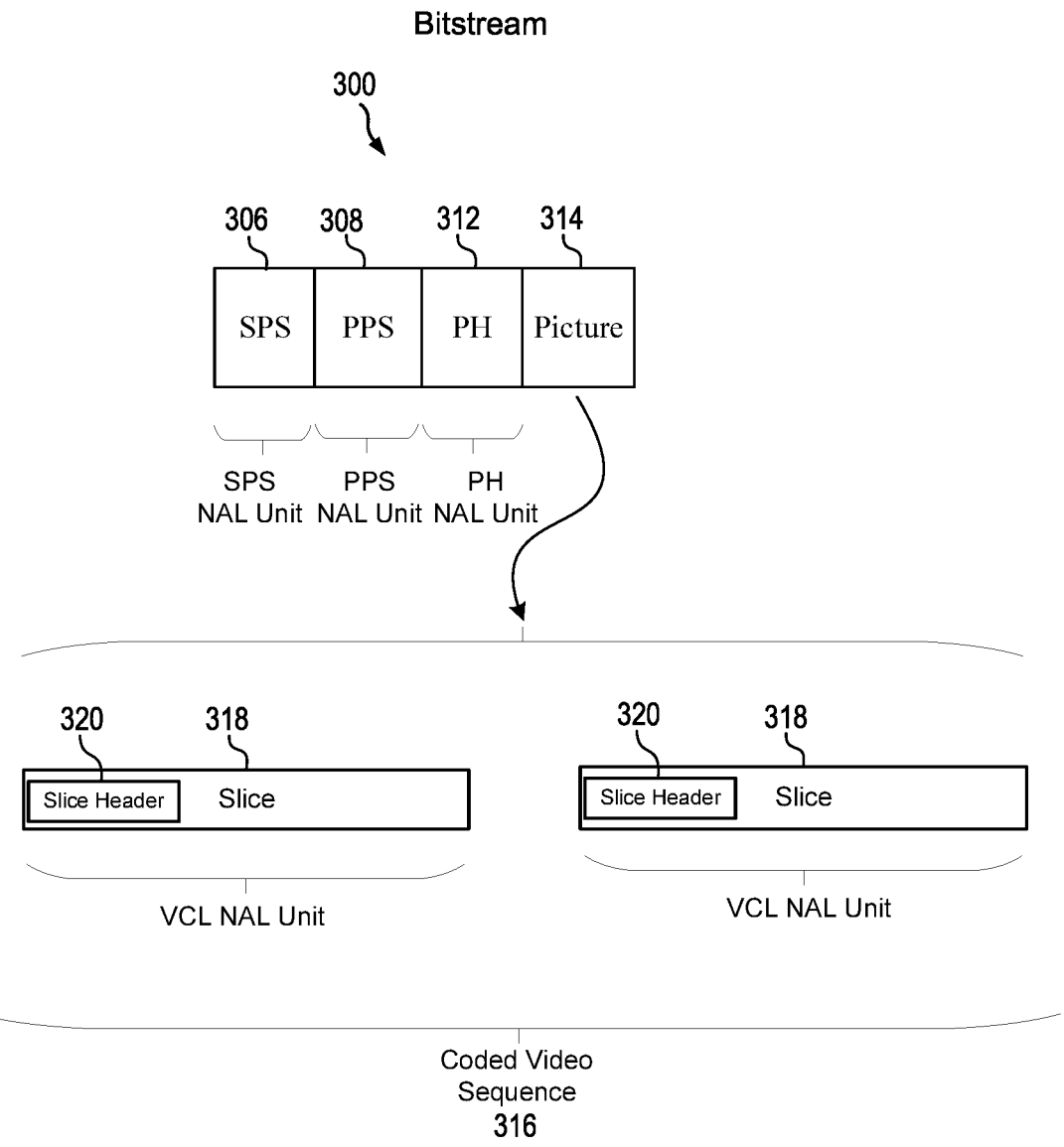
FIG. 3 is a schematic diagram of an embodiment of a video bitstream.

FIG. 3 is a schematic diagram of an embodiment of a video bitstream 300. As used herein the video bitstream 300 may also be referred to as a coded video bitstream, a bitstream, or variations thereof. As shown in FIG. 3, the bitstream 300 comprises one or more of the following: a sequence parameter set (SPS) 306, a picture parameter set (PPS) 308, a picture header (PH) 312, and a picture 314. The SPS 306 and the PPS 308 may be generically referred to as a parameter set. In an embodiment, other parameter sets not shown in FIG. 3 may also be included in the bitstream 300 such as, for example, a video parameter set (VPS), an adaption parameter set (APS), and so on.

The SPS 306 contains data that is common to all the pictures in a sequence of pictures (SOP). The SPS 306 is a syntax structure containing syntax elements that apply to zero or more entire CLVSs as determined by the content of a syntax element found in the PPS referred to by a syntax element found in each picture header. In contrast, the PPS 308 contains data that is common to the entire picture. The PPS 308 is a syntax structure containing syntax elements that apply to zero or more entire coded pictures.

The SPS 306, and the PPS 308 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the SPS 306 is a non-VCL NAL unit designated as a SPS NAL unit. Therefore, the SPS NAL unit has an SPS NUT. In an embodiment, the PPS 308 is contained in a non-VCL NAL unit designated as a PPS NAL unit. Therefore, the PPS NAL unit has a PPS NUT.

The PH 312 is a syntax structure containing syntax elements that apply to all slices (e.g., slices 318) of a coded picture (e.g., picture 314). In an embodiment, the PH 312 is in a non-VCL NAL unit designated a PH NAL unit. Therefore, the PH NAL unit has a PH NUT (e.g., PH_NUT). In an embodiment, one PH NAL unit is present for each picture 314 in the bitstream 300.

The picture 314 is an array of luma samples in monochrome format or an array of luma samples and two corresponding arrays of chroma samples in 4:2:0, 4:2:2, and 4:4:4 color format. The picture 314 may be either a frame or a field. However, in one coded video sequence (CVS) 316, either all pictures 314 are frames or all pictures 314 are fields. The CVS 316 is a coded video sequence for every coded layer video sequence (CLVS) in the video bitstream 300. Notably, the CVS 316 and the CLVS are the same when the video bitstream 300 includes a single layer. The CVS 316 and the CLVS are only different when the video bitstream 300 includes multiple layers.

Each picture 314 contains one or more slices 318. A slice 318 is an integer number of complete tiles or an integer number of consecutive complete coding tree unit (CTU) rows within a tile of a picture (e.g., picture 314). Each slice 318 is exclusively contained in a single NAL unit (e.g., a VCL NAL unit). A tile (not shown) is a rectangular region of CTUs within a particular tile column and a particular tile row in a picture (e.g., picture 314). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

Each CTB can be differently split into multiple coding blocks (CBs). The CB is the decision point whether to perform inter-picture or intra-picture prediction. More precisely, the prediction type is coded in a coding unit (CU). A CU consists of three CBs (Y, Cb, and Cr) and associated syntax elements.

In an embodiment, each slice 318 contains a slice header 320. A slice header 320 is the part of the coded slice 318 containing the data elements pertaining to all tiles or CTU rows within a tile represented in the slice 318. That is, the slice header 320 contains information about the slice 318 such as, for example, the slice type, which of the reference pictures will be used, and so on.

The pictures 314 and their slices 318 comprise data associated with the images or video being encoded or decoded. Thus, the pictures 314 and their slices 318 may be simply referred to as the payload or data being carried in the bitstream 300.

Those skilled in the art will appreciate that the bitstream 300 may contain other parameters and information in practical applications.

Duplicate or repetitive padding may be used to expand a picture to a bigger size. More specifically, reference pictures (e.g., reference frame 130 in FIG. 1, or preceding reference frame 220 or subsequent reference frame 231 in FIG. 2) are extended to form a bigger picture. For example, boundary samples located at a left boundary of the reference picture are copied to the left of the reference picture, boundary samples located at a right boundary of the reference picture are copied to the right of the reference picture, boundary samples located at a top boundary of the reference picture are copied above the reference picture, and boundary samples located at a bottom boundary of the reference picture are copied below the reference picture. These copied boundary samples located outside the reference picture are referred to as padded samples (a.k.a., padding samples).

For current picture coding, when a motion vector (e.g., MV 135) of a current block (e.g., current block 111) points to a reference block (e.g., reference block 131) which (partially or completely) locates outside the reference picture (e.g., reference frame 130), the prediction block of the current block is generated from padded samples outside the reference picture boundary.

Motion compensated boundary padding is discussed in "Description of SDR HDR and 360 video coding technology proposal by Qualcomm and Technicolor—low and high complexity versions" by Y. W. Chen, et al., JEVT document JVET-J0021, 2018. When a decoder performs motion compensation, if the motion vector points to a block outside the reference frame boundary, a part of the reference block is unavailable. To remedy that issue, the reference picture/frame may be expanded or enlarged using padded samples. For each region with a size of 4×M or M×4 along the boundary of the reference picture to be padded, M being the desired frame boundary extension, a motion vector is derived from the nearest 4×4 block inside the frame. If the nearest 4×4 block is intra coded, a zero motion vector is used. If the nearest 4×4 block is coded with bi-directional inter prediction, only the motion vector, which points to the pixel farther away from the frame boundary, is used in motion compensation for padding. After the motion vector derivation, motion compensation is then performed to obtain the pixels in the padding region with the consideration of average pixel value offset between the nearest 4×4 block and its corresponding block in its reference picture.

Due to the rationale of duplicate padding in the existing standard, the padding length can be any value as long as the padding length does not exceed the allowed range of motion vectors. This rationale is no longer efficient when a motion-compensated padding is applied.

The existing picture boundary padding copy samples from the boundary to the extended areas. Moreover, the conventional motion compensated padding methods simply derive motion vectors from M×4 coded blocks. The conventional motion compensated padding methods fail to exploit the continuity of movement that can be traced by motions inside the picture or between successive pictures.

In addition, the existing picture boundary padding fails to consider the potential motion difference between boundary sample/block and the extended sample/block. In addition, the existing picture boundary padding fails to consider the potential discontinuity issues/artifacts along the edges of neighboring padding units.

Disclosed herein are techniques that solve the above problems and some other problems not mentioned. For example, the techniques disclosed herein clip a motion vector of a padding sample to be within a motion vector range. The motion vector range is based on a maximum padding dimension of an extended area around a video unit of a video. Clipping the motion vector ensures that the motion vector points to a sample within the extended area. The techniques described herein should be considered as examples to explain the general concepts and should not be interpreted in a narrow way. Furthermore, these items can be applied individually or combined in any manner.

Figure 4:
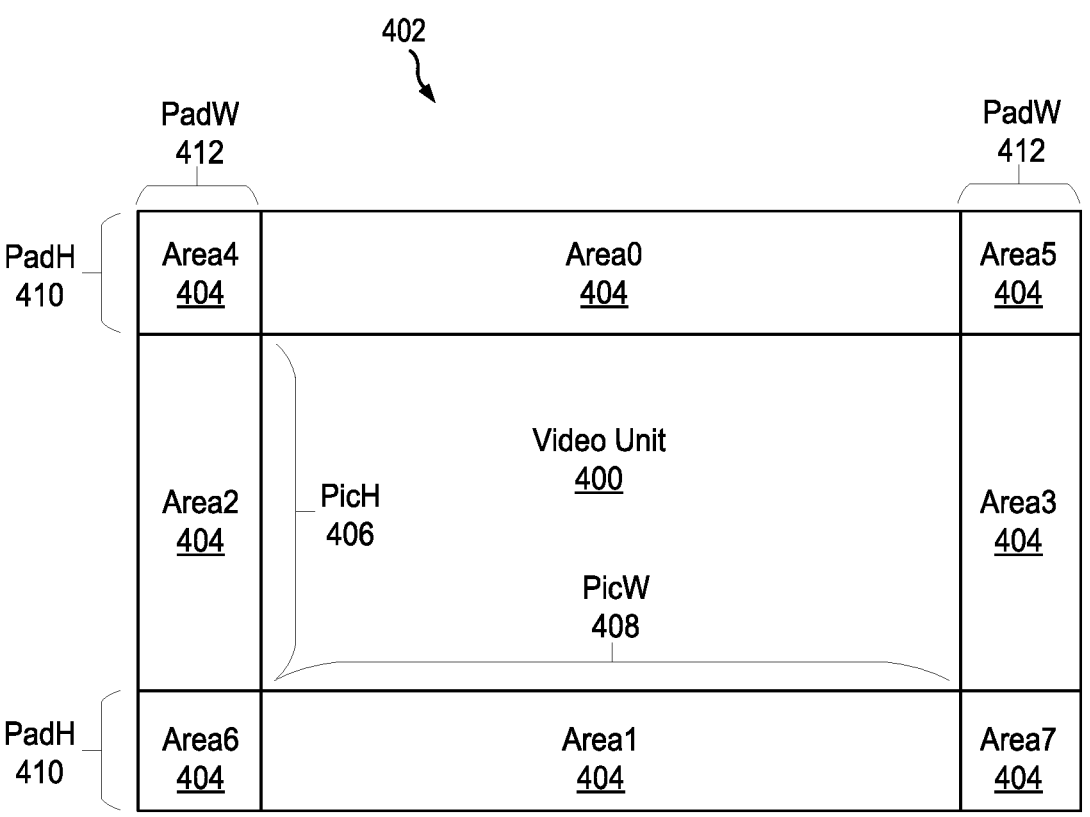
FIG. 4 is a schematic diagram of a video unit padded or expanded to a larger video unit using padding areas disposed around the video unit.

FIG. 4 is a schematic diagram of a video unit 400 (e.g., picture, slice, tile, sub-picture, reference picture, etc.) padded or expanded to a larger video unit 402 using padding areas 404 disposed around the video unit 400. The video unit 400 has a height 406 (PicH) and a width 408 (PicW). Each of the padding areas 404 has a horizontal padding dimension 410 (PadH) and a vertical padding dimension 412 (PadW). Thus, the larger video unit 402 has overall dimensions of (picW+2×padW)×(picH+2×padH). For purposes of discussion, the padding areas 404 have been labeled Area0, Area1, Area2, Area3, Area4, Area5, Area6, and Area1. The padding areas 404 labeled Area0, Area1, Area2, Area3 may be referred to herein as adjacent padding areas. In addition, the padding areas 404 labeled Area4, Area5, Area6, and Area1 may be referred to herein as corner padding areas.

In the present disclosure, the video unit (picW×picH) is padded to a bigger picture (picW+2×padW)×(picH+2×padH). PicW and picH denote the video unit (e.g., a picture) size in width and height dimensions, respectively. padW and padH denote the padding length of one side along with the width and height directions, respectively, as shown in FIG. 4.

Note that in the following descriptions, it is assumed the video unit is a picture. It is also assumed that only the picture picW×picH is coded to a compressed bitstream, while the padding area is generated at both the encoder and decoder side to form a larger reference picture for inter prediction of future pictures in the decoding order.

Figure 5:
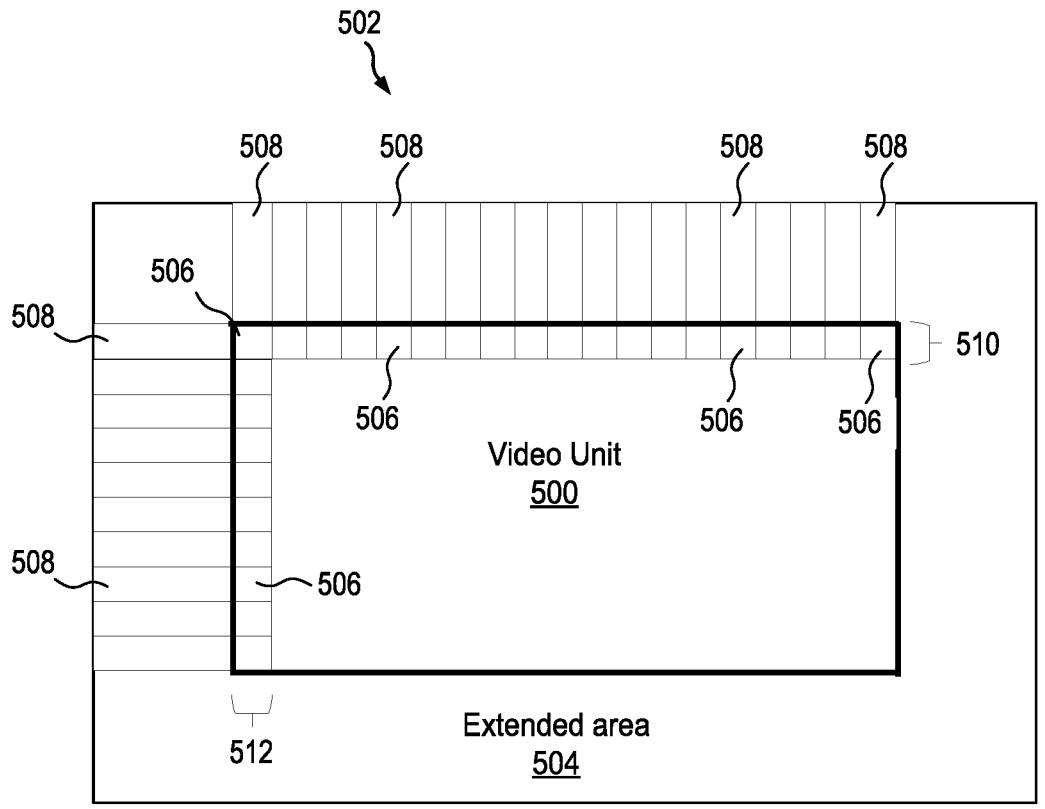
FIG. 5 is a schematic diagram of a video unit padded or expanded to a larger video unit using the extended area disposed around the video unit.

FIG. 5 is a schematic diagram of a video unit 500 padded or expanded to a larger video unit 502 using the extended area 504 disposed around the video unit 500. The video unit 500 and the larger video unit 502 of FIG. 5 are similar to the video unit 400 and the larger video unit 402 of FIG. 4, respectively. The extended area 504 in FIG. 5 is equivalent to a culmination of the padding areas 404 in FIG. 4.

As shown, the video unit 500 includes boundary samples 506 disposed within the video unit 500. The boundary samples 506 in the video unit 500 are considered to be corresponding to the padding samples 508 in the extended area 504 when the boundary samples 506 are adjacent to the padding samples 508 in the extended area 504. That is, a boundary sample 506 immediately adjacent to, or directly across from, a padding sample 508 in the extended area 504 is said to be corresponding to the padding sample 508.

The boundary samples 506 disposed at the top of the video unit 500 are considered to be in a top row 510. Likewise, the boundary samples 506 disposed at the left side of the video unit 500 are considered to be in a left column 512. In similar fashion, those skilled in the art will recognize that the boundary samples 506 disposed at the bottom of the video unit 500 (not shown) are considered to be in a bottom row (not shown) and the boundary samples 506 disposed at the right side of the video unit 500 (not shown) are considered to be in a right column (not shown). The boundary samples 506 at an intersection of a row and column (e.g., row 510 and column 512) may be referred to as corner boundary samples.

Like the boundary samples 506, the padding samples 508 may also be considered to be organized in rows and columns. For example, the padding sample 508 (or samples) at the top of Area 2 (see FIGS. 4-5) is considered to be in a top row 510. The padding sample 508 (or samples) at the far left of Area0 is considered to be in a left column 512.

The boundary samples 506 and the padding samples 508 in FIG. 5 may be referred to herein as boundary blocks/units and padding blocks/units, respectively. The extended area 508 in FIG. 5 is similar to a cumulation of the padding areas 404 in FIG. 4. In an embodiment, the boundary samples 506 are referred to as reconstructed samples or predicted samples and padding samples 508 are referred to as samples or luma samples.

From the foregoing, it should be appreciated that FIG. 5 depicts the relationship between the boundary samples 506, which are within the video unit 500, and the padding samples 508, which are outside the video unit 500.

Figure 6:
FIG. 6 is a method for coding video data according to an embodiment of the disclosure.

FIG. 6 is a method 600 for coding video data according to an embodiment of the disclosure. The method 600 may be performed by a video coding apparatus (e.g., an encoder or a decoder) having a processor and a memory. The method 600 may be implemented when determining how to filter padding samples within an extended area around a video unit as part of a motion compensation process where inter prediction (a.k.a., motion compensated prediction) is utilized.

In block 602, the video coding apparatus clips a motion vector of a padding sample to be within a motion vector range. In an embodiment, the motion vector range is based on a maximum padding dimension (e.g., PadW or PadH) of an extended area (e.g., extended area 504) around a video unit (e.g., video unit 500) of a video.

In block 604, the video coding apparatus converts between the video unit of the video and a bitstream (e.g., the bitstream 300) in accordance with the motion vector as constrained. When implemented in an encoder, converting includes receiving a video unit (e.g., a media file) and encoding the video unit and any corresponding parameters into a bitstream. When implemented in a decoder, converting includes receiving a bitstream including the video unit and any corresponding parameters and decoding the bitstream to obtain the video unit and any corresponding parameters.

1. In one example, the padding length such as padW and/or padH of a picture in one direction (e.g., along the left/right/above/bottom side of the picture) may be dependent on the CTU size, and/or inter interpolation filter length, and/or picture dimensions.

a. For example, the padding length padW and/or padH may be calculated based on a×(SIZE+offset), wherein a is an integer such as a=1, SIZE is an integer may or may not be dependent on the CTU width or height, offset is an integer may or may not be dependent on the interpolation filter length used in a video unit.

i. In one example, padW and/or padH may be in a form of padW=a×SIZE (or padH=a×SIZE). For example, padW and/or padH must be even numbers, or padW and/or padH must be in a form of a×B where in B is a constant/variable.

b. For example, the value of padW and/or padH may be dependent on whether reference picture resampling (a.k.a. RPR) is applied and/or how large is the reference picture resampling factor.

c. Alternatively, the padding length padW and/or padH may be a predefined number such as 144, and etc.

d. For example, the padding length padW and/or padH may be dependent on whether there is a second padding method allowed in the codec.

i. Furthermore, the padding length padW and/or padH may be dependent on the allowed padding length of the second padding method.

e. For example, different padding lengths may be used for different pictures in a video bitstream.

i. Alternatively, one padding length is used for all pictures in a video bitstream.

ii. For example, different padding lengths may be used for different slice types (e.g., P or B slice), or different temporal layers.

iii. The padding length may be signaled from the encoder to decoder such as in SPS/PPS/picture header/slice header/CTU/CU.

f. For example, the padding length may depend on color components and/or color format.

g. For example, the padding length above the picture (e.g. padH for Area 0) and the padding length below the picture (e.g. padH for Area 1) may be different.

h. For example, the padding length left to the picture (e.g. padW for Area 2) and the padding length right to the picture (e.g. padW for Area 3) may be different.

2. In one example, if a second padding method (in addition to a first padding method such as repetitive padding) is allowed, the maximum allowed padding length of the second padding method may be different from the padding length of the first padding method.

a. For example, the maximum allowed padding length of the second padding method may be less than (or greater than) the padding length of the first padding method.

b. Alternatively, the maximum allowed padding length of the second padding method may be equal to the padding length of the first padding method.

c. Alternatively, the maximum allowed padding length of the second padding method may be equal to any value (e.g., no limitation).

d. For example, the maximum allowed padding length of the second padding method may be a predefined number such as 64, 144, 160, and etc.

e. For example, the maximum allowed padding length of the second padding method may be calculated based on a*(SIZE+offset), wherein a is an integer such as a=1, SIZE is an integer may or may not be dependent on the CTU width or height, offset is an integer may or may not be dependent on the interpolation filter length used in a video unit.

f. For example, the maximum allowed padding length of the second padding method may be dependent on whether reference picture resampling (a.k.a. RPR) is applied and/or how large is the reference picture resampling factor.

g. For example, whether a first or second padding method is used may be signalled using a syntax element in a video unit such as SPS/PPS/picture header/slice header/CTU/CU.

3. In one example, to fill the padding areas (e.g., Area0 . . . Area7 in FIG. 4) of a picture, it may be processed with a following procedure order:

a. For example, first pad areas {Area0, Area1, Area2, Area3} in a pre-defined order, then pad areas {Area4, Area5, Area6, Area1} in another pre-defined order.

b. For example, first pad areas {Area0, Area1, Area2, Area3} in any order, then pad areas {Area4, Area5, Area6, Area1} in any order.

c. For example, first pad areas {Area4, Area5, Area6, Area1} in a pre-defined order, then pad areas {Area0, Area1, Area2, Area3} in another pre-defined order.

d. For example, first pad areas {Area4, Area5, Area6, Area1} in any order, then pad areas {Area0, Area1, Area2, Area3} in another pre-defined order.

e. In one example, a first padding area may be used to pad a second padding area, in case the first padding area is padded before the second padding area.

4. In one example, when padding areas at the corner parts of a bigger picture (e.g., as illustrated in FIG. 4, Area4 at the top-left corner, Area5 at the top-right corner, Area6 at the bottom-left corner, Area1 at the bottom-right corner), the samples are directly copied from the available boundary samples from either the current picture or the already padded areas.

a. For example, to fill the samples at the top-left corner such as Area4 of the bigger picture, the closest samples of the already padded area on the right such as Area0 may be copied. For example, the boundary samples located at the leftmost column of Area0 are duplicated to the left side and fill Area4.

i. Alternatively, the closest samples of the already padded area on the bottom such as Area2 may be copied. For example, the boundary samples located at the abovemost row of Area2 are duplicated to the above side and fill Area4.

ii. Alternatively, one or more reconstructed samples of the current picture may be copied. For example, the sample located at the top-left corner (i.e., the abovemost row and the leftmost column) of the current picture is duplicated to fill Area4.

b. For example, to fill the samples at the top-right corner such as Area5 of the bigger picture, the closest samples of the already padded area on the left such as Area0 may be copied. For example, the boundary samples located at the rightmost column of Area0 are duplicated to the right side and fill Area5.

i. Alternatively, the closest samples of the already padded area on the bottom such as Area3 may be copied. For example, the boundary samples located at the abovemost row of Area3 are duplicated to the above side and fill Area5.

ii. Alternatively, the reconstructed samples of the current picture may be copied. For example, the sample located at the top-right corner (i.e., the topmost row and the rightmost column) of the current picture is duplicated to fill Area5.

c. For example, to fill the samples at the bottom-left corner such as Area6 of the bigger picture, the closest samples of the already padded area on the right such as Area1 may be copied. For example, the boundary samples located at the leftmost column of Area1 are duplicated to the left side and fill Area6.

i. Alternatively, the closest samples of the already padded area on the above such as Area2 may be copied. For example, the boundary samples located at the bottommost row of Area2 are copied down and fill Area6.

ii. Alternatively, the reconstructed samples of the current picture may be copied. For example, the sample located at the bottom-left corner (i.e., the bottommost row and the leftmost column) of the current picture is duplicated to fill Area6.

d. For example, to fill the samples at the bottom-right corner such as Area1 of the bigger picture, the closest samples of the already padded area on the left such as Area1 may be copied. For example, the boundary samples located at the rightmost column of Area1 are duplicated to the right side and fill Area1.

i. Alternatively, the closest samples of the already padded area on the above such as Area3 may be copied. For example, the boundary samples located at the bottommost row of Area3 are duplicated down and fill Area1.

ii. Alternatively, the reconstructed samples of the current picture may be copied. For example, the sample located at the bottom-right corner (i.e., the bottommost row and the rightmost column) of the current picture is duplicated to fill Area1.

5. In one example, for a certain extended area to be padded (such as an area of Area0 . . . Area7 in FIG. 4), it may be filled in a way of M×N granularity, wherein M is the width of a padding unit/block in luma samples, and N is the height of a padding unit/block in luma samples.

a. For example, when filling the extended area directly to above and/or below of the picture (such as Area0 and/or Area1 in FIG. 4).

i. For example, M and/or N may be dependent on the size of the motion compression unit, such as 4×4, or 8×8, or 16×16 which is dependent on the type of codec.

ii. For example, M is not equal to N.

iii. For example, M may be a predefined number such as M=4, or 8, or 16, and etc.

iv. For example, M and/or N may be dependent on the predefined pad length such as padW and/or padH in FIG. 4.

b. For example, when filling the extended area directly to left and/or right of the picture (such as Area2 and/or Area3 in FIG. 4).

i. For example, N may be dependent on the size of the motion compression unit, such as 4×4, or 8×8, or 16×16 which is dependent on the type of codec.

ii. For example, M is not equal to N.

iii. For example, N is a predefined number such as N=4, or 8, or 16, and etc.

iv. For example, M may be dependent on the predefined pad length such as padW in FIG. 4.

c. For example, how to derive the padding samples for an M×N padding unit/block may be dependent on coding information of one or more boundary blocks/samples located inside a picture, wherein a boundary block indicates a block/sample located at the first row or last row or first column or last column of a picture.

i. For example, the size of boundary blocks used for picture boundary padding may be dependent on the dimensions of the padding unit/block such as M and/or N.

ii. For example, the size of boundary blocks used for picture boundary padding may be predefined.

iii. For example, the boundary block used for picture boundary padding may be just one or more samples located at the first row or last row or first column or last column of a picture.

d. For example, to fill the samples at the top side such as Area0 of the bigger picture, the samples are directly copied from the available boundary samples at the bottom of current picture.

e. For example, to fill the samples at the bottom side such as Area1 of the bigger picture, the samples are directly copied from the available boundary samples at the top of current picture.

f. For example, to fill the samples at the left side such as Area2 of the bigger picture, the samples are directly copied from the available boundary samples at the right of current picture.

g. For example, to fill the samples at the right side such as Area3 of the bigger picture, the samples are directly copied from the available boundary samples at the left of current picture.

6. In one example, how to derive the padding samples for an M□N padding unit/block may be dependent on motion information of one or more boundary blocks/samples located inside a picture, wherein a boundary block indicates a block/sample located at the first row or last row or first column or last column of a picture.

a. In one example, when deriving the padding samples, the motion vectors of one or more boundary blocks/samples located inside a picture are rounded to the integer pixel accuracy, where the integer motion vector may be its nearest integer motion vector.

b. In one example, when deriving the padding samples, N-tap interpolation filtering is used to get the reference samples at sub-pixel positions. For example, N may be 2, 4, 6, or 8.

7. The padding method and/or padding size for different boundaries (e.g., top, left, right, bottom) may be different.

8. In one example, the extended area of a picture may not be always filled with samples generated by duplicating boundary samples within the same picture.

a. For example, one or more (but not all) samples in the extended area may be directly copied from certain samples within the same picture.

b. For example, one or more samples in the extended areas may be predicted from predicted/interpolated samples in the same picture or a reference picture using a prediction method.

i. For example, the prediction method may refer to intra prediction, and/or inter prediction, and/or intra block copy (a.k.a. IBC) prediction, and/or palette coding, etc.

c. For example, some samples in the extended areas may be derived from certain samples in the already padded extended areas.

9. In one example, how to generate the extended samples of a picture may be dependent on the coded information (e.g., prediction mode such as MODE_INTRA, MODE_INTER, MODE_IBC, and etc.) of boundary blocks/samples within the same picture or in a reference picture.

a. In one example, one or more samples of extended areas of a picture may be derived from predicted samples generated by a block vector of an IBC coded block.

i. For example, one or more samples in the extended area of a picture may be generated from predicted/interpolated samples based on certain samples within the same picture, wherein the predictor may be identified by a block vector of an IBC coded boundary block, wherein the interpolation filter for deriving the predicted samples may be DCIIF filter, gaussian filter, N-tap filter (N is an integer), and etc.

ii. In another example, how to find the predicted samples may be dependent on block vectors of one or more IBC coded boundary blocks, wherein the block vector may be the original block vector, or a modified block vector such as just one dimension of the original block vector or a clipped block vector, or a weighted block vector from more than one adjacent/non-adjacent block vectors, or a shifted block vector calculated by adding up a delta vector to the original block vector.

b. In one example, one or more samples in the extended area of a picture may be filled with predicted samples generated by applying angular prediction to certain samples within the same picture.

i. For example, how to generate the extended area of a picture may be dependent on the intra angular mode of the boundary blocks within the same picture.

a) For example, a pre-defined angular mode (e.g., horizontal or vertical mode) may be used when the intra prediction modes of the boundary blocks are not angular modes (e.g., Planar or DC), or the boundary blocks are not coded using angular prediction.

ii. For example, how to generate the extended area of a picture may be dependent on the estimated edge direction (e.g., derived from edge detection or gradient calculation) of the boundary blocks within the same picture.

iii. In one example, an extended sample may be predicted with angular prediction by samples which are right to or below the extended sample.

iv. In one example, PDPC may be used to refine the predicted extended samples.

v. In one example, the extended samples may be predicted by MIP.

c. In one example, one or more samples in the extended area of a picture may be filled with predicted samples in its reference pictures generated by motion compensation using inter prediction.

i. For example, one or more samples in the extended area of a picture may be generated from predicted/interpolated samples in reference pictures, wherein the predictor may be identified by one or more motion vectors of inter coded blocks, wherein the interpolation filter for deriving the predicted samples may be DCIIF filter, gaussian filter, N-tap filter (N is an integer), and etc.

ii. For example, how to find the predicted samples may be dependent on motion vectors of the boundary blocks inside the current picture, wherein the motion vector may be the original motion vector, or a modified motion vector such as just one dimension of the original motion vector or a clipped motion vector, or a weighted motion vector from more than two adjacent motion vectors, or a shifted motion vector calculated by adding up a delta vector to the original motion vector.

d. In one example, only if the boundary block inside the current picture is coded by a predefined prediction modes, the corresponding padding block/samples in the extended area of the current picture may be generated by motion-compensated prediction other than duplicate/repetitive padding.

i. For example, only if the boundary block inside the current picture is coded by inter prediction mode, the corresponding padding block/samples in the extended area of the current picture may be generated by motion-compensated prediction other than duplicate/repetitive padding.

ii. For example, if the boundary block inside the current picture is IBC-coded, the corresponding padding block/samples in the extended area of the current picture is generated by duplicate/repetitive padding.

iii. For example, if the boundary block inside the current picture is intra-coded, the corresponding padding block/samples in the extended area of the current picture is generated by duplicate/repetitive padding.

iv. For example, if the boundary block inside the current picture is coded using palette coding mode, the corresponding padding block/samples in the extended area of the current picture is generated by duplicate/repetitive padding.

v. Alternatively, only if the boundary inside the current picture is coded by inter prediction mode or IBC prediction mode, the corresponding padding block/samples in the extended area of the current picture may be generated by motion-compensated prediction other than duplicate/repetitive padding.

10. In one example, given an inter-coded boundary block of the current picture, its adjacent padding unit/block may be filled with padded samples generated from multiple prediction blocks.

a. For example, some of the padded samples may be generated by blending more than one prediction block in the reference pictures, wherein the number of prediction blocks may be dependent on the motion data of the boundary block and/or the motion data of reference blocks in the reference picture of the boundary block.

b. For example, whether to generated padded samples from one prediction or multiple predictions may be dependent on whether the prediction samples derived from a prediction block are inside or outside the reference picture (or the extended area of the reference picture).

c. For example, if the boundary block is predicted from bi-prediction, only one of two prediction blocks may be selected to generate the padded samples.

i. For example, the selection may be based on a rule of cost measurement (such as the total sample difference between a specific prediction block and the current block).

ii. For example, the selection may be based on the magnitudes of horizontal or vertical components of motion vectors of boundary blocks and/or reference blocks.

d. For example, if a reference block of the boundary block is inter-coded, the motion data of the reference block may be also exploited to generate the padded samples for the current picture.

i. For example, the motion vector of the reference block may be scaled to the reference picture of the boundary block, and a prediction block derived from the scaled motion vector may be used to generate the padded samples for the current picture.

ii. For example, the motion vector of the reference block may be not scaled, and a prediction block in the reference picture of the reference block may be used to generate the padded samples of the current picture.

e. For example, more than one prediction block may be exploited to generate the padded samples, wherein more than one prediction block may be weighted to generate a final prediction block, wherein the weighting factors for a specific prediction block/sample may be dependent on the POC distance between reference picture and the current picture, and etc.

f. In one example, a padded sample S may be generated as a weighted sum of n prediction samples Pk, as $$S = \sum_{k=0}^{n-1} W_k \times P_k.$$

i. In one example, Pk may be generated by inter-prediction.

ii. In one example, Pk may be generated by intra-prediction.

iii. In one example, Pk may be generated by IBC prediction.

iv. In one example, Pk may be generated by inter-prediction with MVk, Pj may be generated by inter-prediction with MVj, and MVk may be different from MVj.

a) In one example, MVj and MVk may be obtained from different blocks.

b) In one example, MVk or MVj may be obtained from a neighboring padded block.

c) In one example, MVk or MVj may be obtained from a corresponding block inside the picture.

v. In one example, $$\sum_{k=0}^{n-1} W_k = 0.$$

a) In one example, the weighting values may be dependent on the position of S.

11. In one example, what motion vector is used to generate the padded samples may be dependent on a motion model.

a. For example, a synthesized motion vector may be generated from multiple motion vectors of multiple adjacent coding blocks inside the current picture. For example, suppose there are N motion vector candidates constructing from multiple adjacent coding blocks, the synthesized motion vector may be computed as $(a_0 \times MV0 + a_1 \times MV1 + a_2 \times MV2 + \ldots a_n \times MVn + \text{offset}) >>> \log 2(N)$, wherein $a_0, a_1, a_2, \ldots, a_n$ are scaling factors, and offset is a constant value. In another example, the synthesized motion vector may be computed as $(a_0 \times MV0 + a_1 \times MV1 + a_2 \times MV2 + a_n \times MVn$, wherein the sum of $a_0, a_1, a_2, \ldots, a_n$ is equal to 1.

b. For example, a motion trajectory may be built from multiple motion vectors of multiple adjacent coding blocks inside the current picture. And the motion vector for padded samples may be projected regarding the consistency of the motion trajectory.

12. In one example, how to generate the padded samples may be dependent on whether the boundary block is affine coded or not.

a. For example, if one or more boundary blocks are predicted by affine model, projected motion vectors of padded blocks in a padded unit may be calculated from the motion vectors of affine coded boundary blocks. For example, different projected motion vectors may be calculated for 4×4 padded subblocks in a padded unit/block.

b. In one example, the MV for a padded subblock may be derived with the affine model.

i. In one example, MVs of neighbouring blocks inside the picture adjacent to or non-adjacent to the padded block may be used as control point motion vectors (CPMVs) in the affine model to derive the MV for the padded subblock.

13. In one example, how to generate the padded samples may be dependent on whether the boundary block is Bi-prediction with CU-level weights (aka. BCW) coded or not.

a. For example, the derivation of weighted factors used for generating a padded block from more than one prediction block, may be dependent on the BCW index and/or the weighting factors of an adjacent boundary block.

14. In one example, how to generate the padded samples may be dependent on whether the boundary block is half-pel interpolation coded or not.

a. For example, different interpolation filters may be used to generate the motion compensated padding samples, e.g., if the adjacent boundary block is coded with a half-pel interpolation filter, N-tap filter (such as N=6) is used to generate prediction samples for constructing a padded block. Otherwise, M-tap filter (such as M=8) is used.

b. For example, same interpolation filter may be used to generate all motion compensated padded samples of a padding area.

15. In one example, how to generate the padded samples may be dependent on whether the boundary block is combined inter-intra prediction (CIIP) coded or not.

16. In one example, how to generate the padded samples may be dependent on whether the boundary block is geometric partitioning mode (GPM) coded or not.

17. In one example, whether to and/or how to apply the methods disclosed above may depend on color components and/or color format.

18. In one example, whether to and/or how to apply the methods disclosed above may be signaled to the decoder such as in SPS/PPS/picture header/slice header/CTU/CU.

19. In one example, padded samples in the extended area of a picture (e.g., picture boundary padded samples) may be further filtered.

a. For example, picture boundary padded samples generated by motion compensation and/or intra prediction may be further filtered.

b. For example, picture boundary padded samples generated by duplicate/repetitive padding may be further filtered.

c. For example, whether a picture boundary padded sample is filtered may be dependent on whether it is generated by motion-compensated prediction, intra prediction, or IBC prediction.

i. For example, only the padded samples generated by motion-compensated prediction may be further filtered.

ii. Alternatively, picture boundary padded sample may be filtered no matter how it is generated.

d. For example, a padded sample may be filtered by adding an offset to its sample value.

i. For example, the offset may be calculated dependent on the sample differences between a boundary block inside the current picture and its intra/inter/IBC prediction blocks.

ii. For example, the offset may be calculated dependent on the sample differences between one or more surrounding blocks and their intra/inter/IBC prediction blocks.

iii. For example, assuming the sample differences is denoted as Diffi, wherein i denotes index of samples being calculated, then an offset value may be derived based on a*Func(Diff0, . . . , Diffi, . . . )+b, wherein a and b may be constants such as a=1 and b=0, wherein Func( ) denotes an operation made to those values, such as average operation, minimum, maximum, and etc.

iv. For example, the offset values may be dependent on the distance between the padded sample and the picture boundary.

v. For example, different offset values may be applied to different padded samples dependent on color components.

vi. For example, different offset values may be applied to different padded samples dependent on how the padded sample is generated.

vii. For example, one offset value may be applied to a group of (more than one) padded samples. In one example, the offset value may be clipped before being added to the sample value.

e. For example, a padded sample may be filtered by its neighbouring samples.

i. In one example, the neighbouring sample may be inside the picture.

ii. In one example, the neighbouring sample may be a padded sample.

f. For example, the padded samples may be filtered by a motion-compensated temporal filter exploiting the motion difference in more than one former/successive pictures.

g. For example, how to filter the padded samples may be dependent on the motion data of neighboring padding blocks.

h. For example, how to filter the padded samples may be dependent on the coding information (such as GBI (or BCW) index, motion vector precision, motion data, prediction mode, and etc.) of boundary blocks inside the current picture.

i. For example, how to filter the padded samples may be dependent on whether one or more adjacent blocks inside the current picture are coded with overlapped block motion compensation (a.k.a., OBMC).

j. For example, how to filter the padded samples may be dependent on whether one or more adjacent blocks inside the current picture is coded with local illuminance compensation (a.k.a., LIC).

k. Whether to and/or how to filter a padded sample may depend on the sample position.

l. Whether to and/or how to filter a padded sample may depend on the color component and/or color format.

m. Whether to and/or how to filter a padded sample may be signaled such as in SPS/PPS/picture header/slice header/CTU/CU.

20. In one example, one or more samples at one side or both sides of a padding block edge may be filtered.

a. For example, whether an edge of a padding block is filtered or not may be dependent on whether there is one or more samples at one side of the edge is generated by motion compensation or intra prediction.

b. For example, whether an edge of a padding block is filtered or not may be dependent on how the samples around the edge are predicted.

i. For example, if samples at both sides of the edge are duplicate padded/motion-compensated padded/intra-prediction padded, no filtering operation is applied.

ii. For example, if samples at one side of the edge is duplicate padded, and samples at the other side is not duplicate padded (such as motion-compensated padded or intra-prediction padded), a filtering operation may be applied.

iii. For example, if samples at one side of the edge is motion-compensated padded, and samples at the other side is intra-prediction padded, a filtering operation may be applied.

c. For example, how many samples at each side of a padding block edge are used to determine the filtering ON/OFF or filter strength may be dependent on the padding block size.

i. Alternatively, it may be a pre-defined number.

d. For example, if samples at both sides of the edge are predicted in a same way (e.g., both are motion-compensated padded, or, both are intra prediction padded), whether to filter the samples around the edge may be dependent on the motion vectors, reference indices, intra prediction angles of how the two samples are generated.

i. For example, if the motions that used to generate sample A and sample B which locate at two sides of an edge are different (e.g., different motion vectors, and/or different reference indices), an edge filtering may be processed.

ii. For example, if the motion vector difference of motion vectors that used to generate sample A and sample B, is greater than a threshold (such as ½-pel difference), an edge filtering may be processed.

e. For example, how many padded samples at either side of the edge would be changed in the edge filtering process, may be dependent on a filter strength.

i. For example, the filter strength may be derived from the padding block size.

ii. For example, the number of padding samples being changed may be a pre-defined number.

f. In one example, deblocking process or a simplified deblocking process may be applied on a boundary between two blocks, which are both generated by padding.

g. In one example, deblocking process or a simplified deblocking process may be applied on a boundary between two blocks, at least one of which are generated by padding.

21. Indication of the filtering method and/or filtering coefficients may be signalled in the bitstream.

a. Alternatively, furthermore, it may be conditionally signalled, such as when boundary padding is applied.

22. Filtered samples that are generated by padding may be used to generate inter-prediction.

a. Alternatively, filtered samples that are generated by padding may be used to generate IBC prediction.

23. The padded sample may be filtered by neural network based filtering method, such as convolutional neural network (CNN).

24. In one example, motion vectors of a block may be clipped to a range, based on the maximum allowed padding length of inter prediction, intra prediction, or intra block copy (IBC) prediction-based picture boundary padding. In an embodiment, the range is a motion vector range. The motion vector range may be a range of pixels such as, for example, −64 to +63.5 pixels, −4096 to +4095 pixels, etc. In an embodiment, the maximum allowed padding length is a maximum padding dimension such as the maximum PadW or the maximum PadH allowed. The maximum allowed padding dimension may be measured in samples (blocks).

Intra prediction, also known as intra-frame coding, is a data compression technique used within a video frame, enabling smaller file sizes and lower bitrates, with little or no loss in quality. Since neighboring pixels within an image are often very similar, rather than storing each pixel independently, the frame image is divided into blocks and the typically minor difference between each pixel can be encoded using fewer bits.

Intra-frame prediction exploits spatial redundancy, i.e. correlation among pixels within one frame, by calculating prediction values through extrapolation from already coded pixels for effective delta coding. Intra-frame prediction is one of the two classes of predictive coding methods in video coding. Its counterpart is inter-frame prediction which exploits temporal redundancy.

Inter prediction, also known and inter-frame prediction, divides a frame into blocks. After that, instead of directly encoding the raw pixel values for each block, the encoder attempts to a block similar to the one the encoder is encoding in a previously encoded frame, referred to as a reference frame. This process is done by a block matching algorithm. When the encoder succeeds on its search, the block can be encoded by a vector, known as motion vector, which points to the position of the matching block in the reference frame. The process of motion vector determination is called motion estimation.

Intra block copy allows for the prediction of a given intra coded block to be a copy of another intra coded block in the same frame (i.e., from the reconstructed part of the current frame).

a. For example, a reference block of a reference picture identified by a motion vector may be required not to exceed the larger picture boundary. That is, the reference sample is constrained to being within the extended area. The size of the larger picture (e.g., larger video unit 402) may be calculated dependent on accumulating the coded/original picture size (e.g., the video unit 400), plus inter/intra/IBC prediction-based picture boundary padding length, plus duplicated padding length. That is, the video unit and the extended area collectively form the larger video unit. The size of the larger video unit is dependent upon the size of the video unit, a vertical padding dimension of the extended area, and a horizontal padding dimension of the extended area. In an embodiment, one portion of the extended area is filled with padding samples generated by inter prediction, intra prediction, or IBC, and another portion of the extended area is filled with padding samples generated by duplication.

b. For examples, all motion vectors used for motion compensation may be required not to exceed the larger picture boundary. In an embodiment, all motion vectors are constrained to being within the extended area. In an embodiment, all motion vectors are constrained (e.g., by clipping) to being within the extended area.

c. For example, motion vectors used to derive the padded samples during the motion-compensated picture boundary padding, may be clipped based on the size of the larger picture (e.g., a padded picture contains both the original size of video picture and the extended area created by picture boundary padding).

i. For example, such motion vector may be clipped to make sure the corresponding predicted block/samples does not exceed the boundary of the larger picture (a.k.a., bigger picture).

ii. For example, such motion vector may be clipped to make sure there is no sample exceeding the boundary of the larger picture being fetched for the motion compensation of the predicted block/samples.

25. In one example, duplicate/repetitive padding (e.g., directly copy the boundary samples located at the edge inside a smaller picture to extended areas to form a bigger picture) is mandated for a reference picture when motion compensation is applied to a video unit.

a. For example, the extended regions may be mixed with a first padding method (e.g., inter/intra/IBC based picture boundary padding) and a second padding method (e.g., duplicate/repetitive padding), in which the second padding method is mandated for filling the outermost samples in the extended regions. That is, an innermost portion of the extended area proximate the video unit is filled with padding samples according to a first padding method, and an outermost portion of the extended area outside the innermost area is filled with the padding samples according to a second padding method different than the first padding method. As used herein, the innermost portion of the extended area may refer to the portion of the extended area closest to the boundary of the video unit, while the outermost portion may refer to the portion of the extended area beyond or outside of the innermost portion and furthest away from the boundary of the video unit.

b. For example, no matter whether inter/intra/IBC based picture boundary padding is allowed or not, duplicate/repetitive padding may be always applied to the outermost regions of a larger picture.

c. For example, the outermost samples in the extended regions such as Area0 . . . Area7 in FIG. 4 are generated by duplicate/repetitive padding.

d. For example, the length of duplicate/repetitive padding region of a bigger picture may be greater than a threshold, wherein the threshold may be dependent on coding information such as motion interpolation filter length, maximum allowed CU size, CTU size, etc. In an embodiment, the length of an interpolation filter may be indicated by the number of taps associated with the filter (e.g., for example, a filter being a 2-tap filter, a 4-tap filter, etc.).

26. In one example, the picture boundary padding may be conducted in a unit-basis way instead of a sample-basis way. For example, the extended area may be filled using padding units containing multiple padding samples instead of the extended area being filled using individual samples added to the extended area consecutively or one after another.

a. For example, the motion-compensated padding may be conducted based on M×N unit (such as N or M=2 or 4 in luma samples).

b. For example, the minimum motion-compensated padding unit may be M×N. That is, a minimum size of the padding unit may be M×N.

27. In one example, for motion-compensated padding, whether the predicted samples/blocks (e.g., interpolated samples in reference pictures other than current picture) are used to construct padded blocks of the current picture may be dependent on where the predicted samples/blocks are located.

a. For example, as long as predicted samples located inside a larger picture (e.g., a padded picture contains both the original size of video picture and the extended area created by picture boundary padding), those predicted samples can be used to get the padding samples of the current picture.

b. For example, only predicted samples located inside a video picture with the original picture size (other than padded areas of a bigger picture) can be used to get the padding samples of the current picture.

c. For example, the predicted samples located outside a video picture (e.g., the padding samples 508) but inside the padding area of the corresponding bigger picture (e.g., a padded picture contains both the original size of video picture and the extended area created by picture boundary padding), may not be used to get the padding samples of the current picture. That is, predicted samples within the extended area are prohibited from being used to generate padding samples, including the padding sample, of the video unit.

28. In one example, for motion-compensated padding, whether the predicted samples/blocks (e.g., interpolated samples from video pictures other than the current picture) are used to construct padded blocks of the current picture may be dependent on the values of motion vectors of samples/blocks in the current picture. Suppose the MV derived for a block to be padded is denoted as (MVx, MVy). MVx represents a horizontal motion vector and MVy represents a vertical motion vector.

a. For example, for padding the top boundary of a picture, whether there is a valid motion-compensated padding unit in a reference picture may be dependent on MVy. For example, it may depend on whether the vertical motion vector of a boundary sample/block of the current picture is positive or not.

b. For example, for padding the bottom boundary of a picture, whether there is a valid motion-compensated padding unit in a reference picture may be dependent on MVy. For example, it may depend on whether the vertical motion vector of a boundary sample/block of the current picture is negative or not.

c. For example, for padding the left boundary of a picture, whether there is a valid motion-compensated padding unit in a reference picture may be dependent on MVx. For example, it may depend on whether the horizontal motion vector of a boundary sample/block of the current picture is positive or not.

d. For example, for padding the right boundary of a picture, whether there is a valid motion-compensated padding unit in a reference picture may be dependent on MVx. For example, it may depend on whether the horizontal motion vector of a boundary sample/block of the current picture is negative or not.

Figure 7:
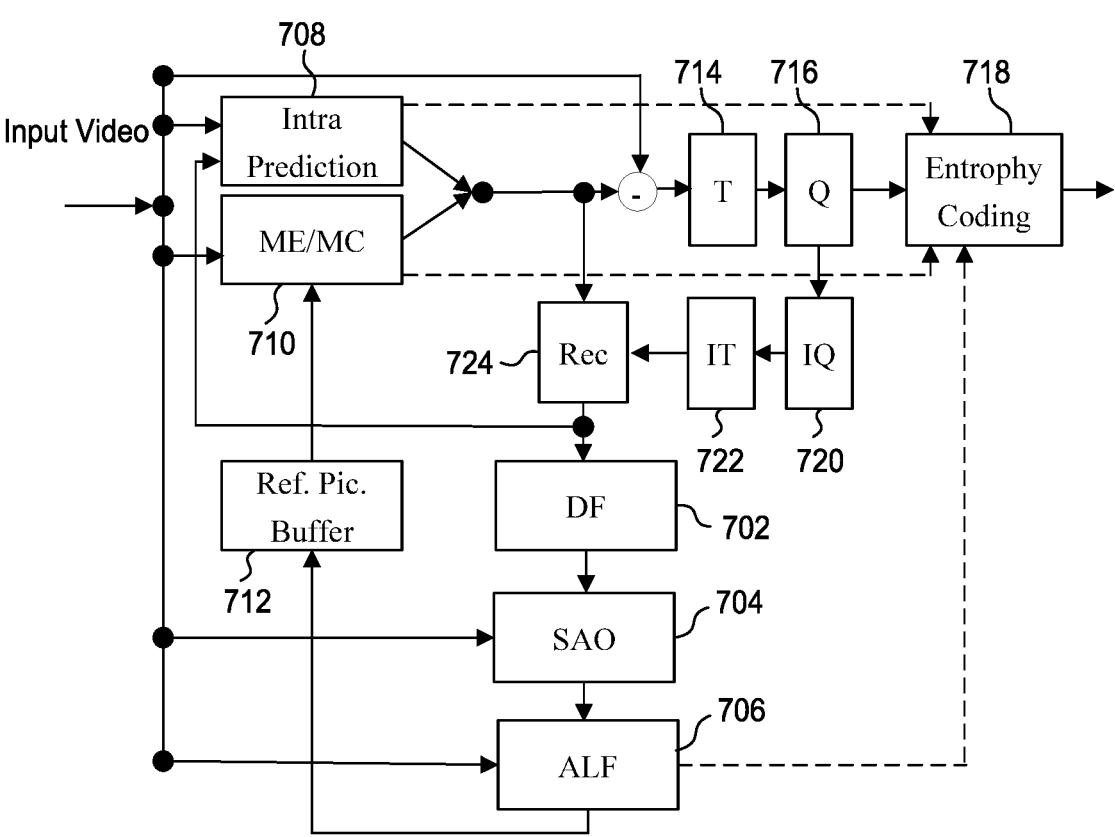
FIG. 7 is a schematic diagram of an encoder.

FIG. 7 is a schematic diagram of an encoder 700. The encoder 700 is suitable for implementing the techniques of VVC. The encoder 700 includes three in-loop filters, namely a deblocking filter (DF) 702, a sample adaptive offset (SAO) 704, and an adaptive loop filter (ALF) 706. Unlike the DF 702, which uses predefined filters, the SAO 704 and the ALF 706 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 706 is located at the last processing stage of each picture and can be regarded as a tool trying to catch and fix artifacts created by the previous stages.

The encoder 700 further includes an intra prediction component 708 and a motion estimation/compensation (ME/MC) component 710 configured to receive input video. The intra prediction component 708 is configured to perform intra prediction, while the ME/MC component 710 is configured to utilize reference pictures obtained from a reference picture buffer 712 to perform inter prediction. Residual blocks from inter prediction or intra prediction are fed into a transform component 714 and a quantization component 716 to generate quantized residual transform coefficients, which are fed into an entropy coding component 718. The entropy coding component 718 entropy codes the prediction results and the quantized transform coefficients and transmits the same toward a video decoder (not shown). Quantization components output from the quantization component 716 may be fed into an inverse quantization component 720, an inverse transform component 722, and a reconstruction (REC) component 724. The REC component 724 is able to output images to the DF 702, the SAO 704, and the ALF 706 for filtering prior to those images being stored in the reference picture buffer 712.

The input of the DF 702 is the reconstructed samples before in-loop filters. The vertical edges in a picture are filtered first. Then the horizontal edges in a picture are filtered with samples modified by the vertical edge filtering process as input. The vertical and horizontal edges in the CTB s of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 8:
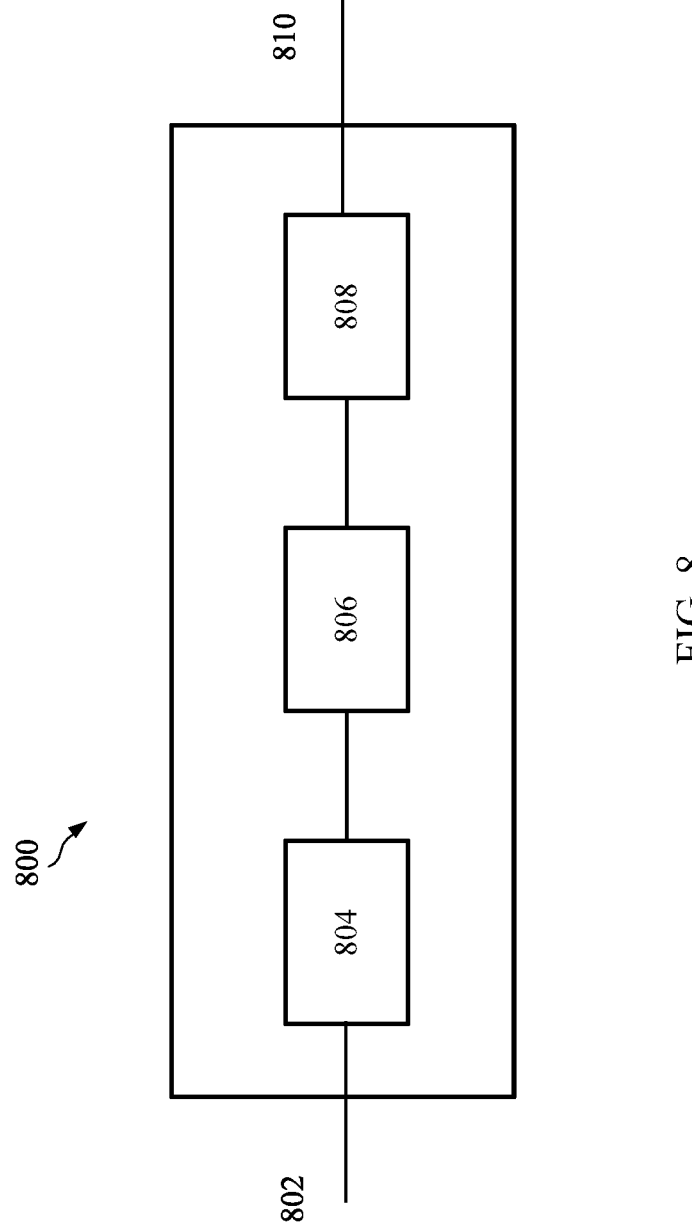
FIG. 8 is a block diagram showing an example video processing system.

FIG. 8 is a block diagram showing an example video processing system 800 in which various techniques disclosed herein may be implemented. Various implementations may include some or all of the components of the video processing system 800. The video processing system 800 may include input 802 for receiving video content. The video content may be received in a raw or uncompressed format, e.g., 8 or 10 bit multi-component pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 800 may include a coding component 804 that may implement the various coding or encoding methods described in the present document. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bit-stream (or coded) representation of the video received at the input 802 may be used by the component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 9:
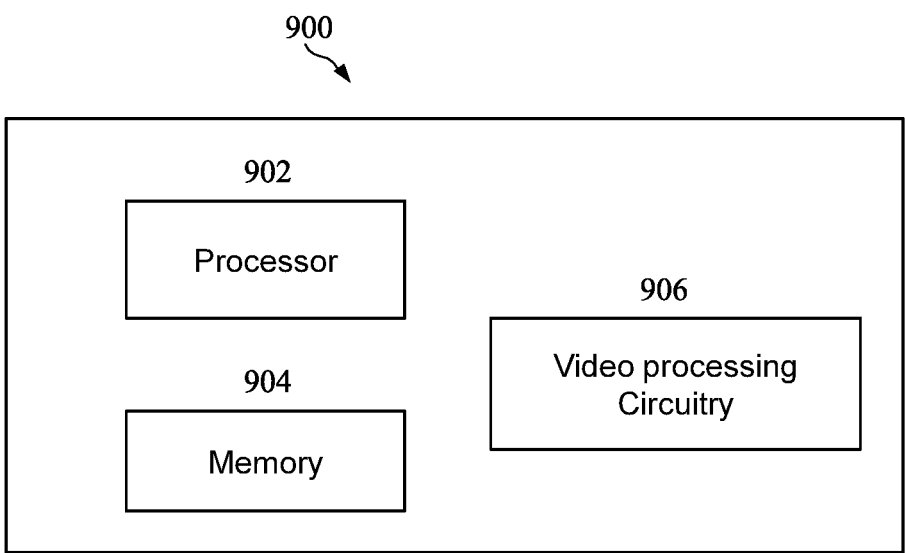
FIG. 9 is a block diagram of a video processing apparatus.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present document. The memory (memories) 904 may be used for storing data and code used for implementing the methods and techniques described herein. The video processing hardware 906 may be used to implement, in hardware circuitry, some techniques described in the present document. In some embodiments, the hardware 906 may be partly or completely located within the processor 902, e.g., a graphics processor.

Figure 10:
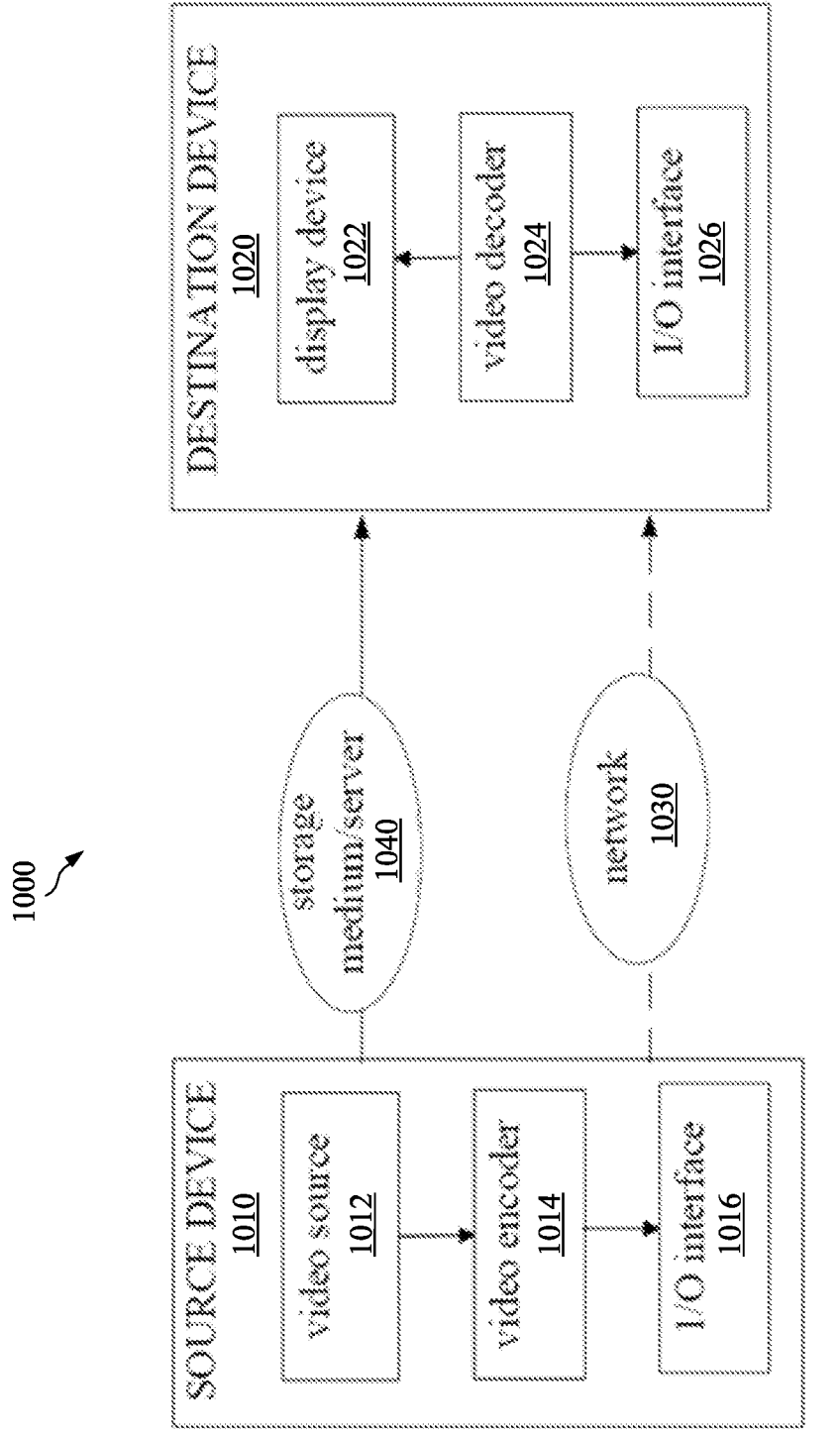
FIG. 10 is a block diagram that illustrates an example video coding system.

FIG. 10 is a block diagram that illustrates an example video coding system 1000 that may utilize the techniques of this disclosure. As shown in FIG. 10, the video coding system 1000 may include a source device 1010 and a destination device 1020. Source device 1010 generates encoded video data which may be referred to as a video encoding device. Destination device 1020 may decode the encoded video data generated by source device 1010 which may be referred to as a video decoding device.

Source device 1010 may include a video source 1012, a video encoder 1014, and an input/output (I/O) interface 1016.

Video source 1012 may include a source such as a video capture device, an interface to receive video data from a video content provider, and/or a computer graphics system for generating video data, or a combination of such sources. The video data may comprise one or more pictures. Video encoder 1014 encodes the video data from video source 1012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1016 may include a modulator/demodulator (modem) and/or a transmitter. The encoded video data may be transmitted directly to destination device 1020 via I/O interface 1016 through network 1030. The encoded video data may also be stored onto a storage medium/server 1040 for access by destination device 1020.

Destination device 1020 may include an I/O interface 1026, a video decoder 1024, and a display device 1022.

I/O interface 1026 may include a receiver and/or a modem. I/O interface 1026 may acquire encoded video data from the source device 1010 or the storage medium/server 1040. Video decoder 1024 may decode the encoded video data. Display device 1022 may display the decoded video data to a user. Display device 1022 may be integrated with the destination device 1020, or may be external to destination device 1020 which may be configured to interface with an external display device.

Video encoder 1014 and video decoder 1024 may operate according to a video compression standard, such as the High Efficiency Video Coding (HEVC) standard, Versatile Video Coding (VVC) standard, and other current and/or further standards.

Figure 11:
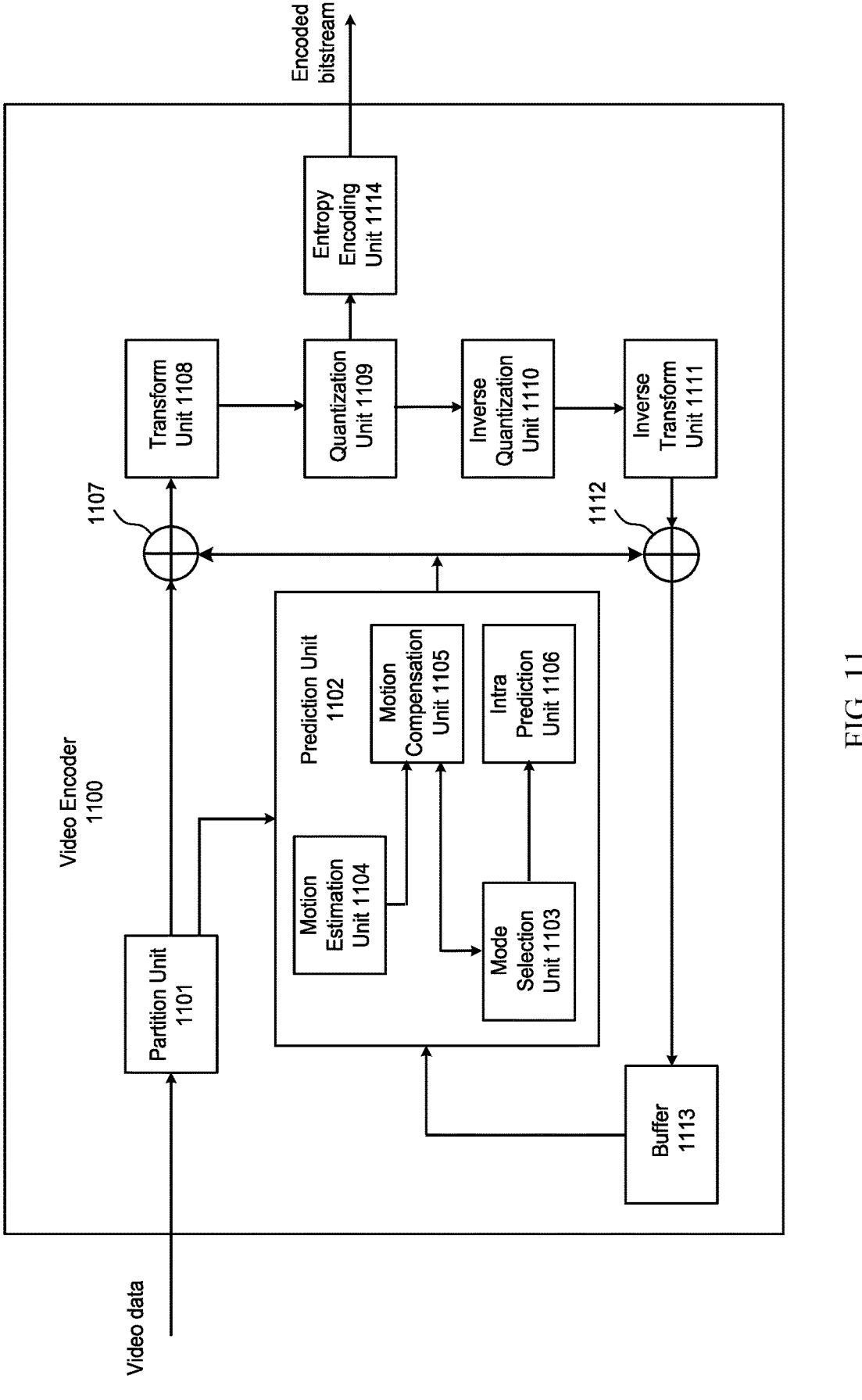
FIG. 11 is a block diagram illustrating an example of video encoder.

FIG. 11 is a block diagram illustrating an example of video encoder 1100, which may be video encoder 1014 in the video coding system 1000 illustrated in FIG. 10.

Video encoder 1100 may be configured to perform any or all of the techniques of this disclosure. In the example of FIG. 11, video encoder 1100 includes a plurality of functional components. The techniques described in this disclosure may be shared among the various components of video encoder 1100. In some examples, a processor may be configured to perform any or all of the techniques described in this disclosure.

The functional components of video encoder 1100 may include a partition unit 1101, a prediction unit 1102 which may include a mode selection unit 1103, a motion estimation unit 1104, a motion compensation unit 1105, an intra prediction unit 1106, a residual generation unit 1107, a transform unit 1108, a quantization unit 1109, an inverse quantization unit 1110, an inverse transform unit 1111, a reconstruction unit 1112, a buffer 1113, and an entropy encoding unit 1114.

In other examples, video encoder 1100 may include more, fewer, or different functional components. In an example, prediction unit 1102 may include an intra block copy (IBC) unit. The IBC unit may perform prediction in an IBC mode in which at least one reference picture is a picture where the current video block is located.

Furthermore, some components, such as motion estimation unit 1104 and motion compensation unit 1105 may be highly integrated, but are represented in the example of FIG. 11 separately for purposes of explanation.

Partition unit 1101 may partition a picture into one or more video blocks. Video encoder 1014 and video decoder 1024 of FIG. 10 may support various video block sizes.

Mode selection unit 1103 may select one of the coding modes, intra or inter, e.g., based on error results, and provide the resulting intra- or inter-coded block to a residual generation unit 1107 to generate residual block data and to a reconstruction unit 1112 to reconstruct the encoded block for use as a reference picture. In some examples, mode selection unit 1103 may select a combination of intra and inter prediction (CLIP) mode in which the prediction is based on an inter prediction signal and an intra prediction signal. Mode selection unit 1103 may also select a resolution for a motion vector (e.g., a sub-pixel or integer pixel precision) for the block in the case of inter-prediction.

To perform inter prediction on a current video block, motion estimation unit 1104 may generate motion information for the current video block by comparing one or more reference frames from buffer 1113 to the current video block. Motion compensation unit 1105 may determine a predicted video block for the current video block based on the motion information and decoded samples of pictures from buffer 1113 other than the picture associated with the current video block.

Motion estimation unit 1104 and motion compensation unit 1105 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1104 may perform uni-directional prediction for the current video block, and motion estimation unit 1104 may search reference pictures of list 0 or list 1 for a reference video block for the current video block. Motion estimation unit 1104 may then generate a reference index that indicates the reference picture in list 0 or list 1 that contains the reference video block and a motion vector that indicates a spatial displacement between the current video block and the reference video block. Motion estimation unit 1104 may output the reference index, a prediction direction indicator, and the motion vector as the motion information of the current video block. Motion compensation unit 1105 may generate the predicted video block of the current block based on the reference video block indicated by the motion information of the current video block.

In other examples, motion estimation unit 1104 may perform bi-directional prediction for the current video block, motion estimation unit 1104 may search the reference pictures in list for a reference video block for the current video block and may also search the reference pictures in list 1 for another reference video block for the current video block. Motion estimation unit 1104 may then generate reference indexes that indicate the reference pictures in list 0 and list 1 containing the reference video blocks and motion vectors that indicate spatial displacements between the reference video blocks and the current video block. Motion estimation unit 1104 may output the reference indexes and the motion vectors of the current video block as the motion information of the current video block. Motion compensation unit 1105 may generate the predicted video block of the current video block based on the reference video blocks indicated by the motion information of the current video block.

In some examples, motion estimation unit 1104 may output a full set of motion information for decoding processing of a decoder.

In some examples, motion estimation unit 1104 may not output a full set of motion information for the current video. Rather, motion estimation unit 1104 may signal the motion information of the current video block with reference to the motion information of another video block. For example, motion estimation unit 1104 may determine that the motion information of the current video block is sufficiently similar to the motion information of a neighboring video block.

In one example, motion estimation unit 1104 may indicate, in a syntax structure associated with the current video block, a value that indicates to the video decoder 1024 that the current video block has the same motion information as another video block.

In another example, motion estimation unit 1104 may identify, in a syntax structure associated with the current video block, another video block and a motion vector difference (MVD). The motion vector difference indicates a difference between the motion vector of the current video block and the motion vector of the indicated video block. The video decoder 1024 may use the motion vector of the indicated video block and the motion vector difference to determine the motion vector of the current video block.

As discussed above, video encoder 1014 may predictively signal the motion vector. Two examples of predictive signaling techniques that may be implemented by video encoder 1014 include advanced motion vector prediction (AMVP) and merge mode signaling.

Intra prediction unit 1106 may perform intra prediction on the current video block. When intra prediction unit 1106 performs intra prediction on the current video block, intra prediction unit 1106 may generate prediction data for the current video block based on decoded samples of other video blocks in the same picture. The prediction data for the current video block may include a predicted video block and various syntax elements.

Residual generation unit 1107 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1107 may not perform the subtracting operation.

Transform unit 1108 may generate one or more transform coefficient video blocks for the current video block by applying one or more transforms to a residual video block associated with the current video block.

After transform unit 1108 generates a transform coefficient video block associated with the current video block, quantization unit 1109 may quantize the transform coefficient video block associated with the current video block based on one or more quantization parameter (QP) values associated with the current video block.

Inverse quantization unit 1110 and inverse transform unit 1111 may apply inverse quantization and inverse transforms to the transform coefficient video block, respectively, to reconstruct a residual video block from the transform coefficient video block. Reconstruction unit 1112 may add the reconstructed residual video block to corresponding samples from one or more predicted video blocks generated by the prediction unit 1102 to produce a reconstructed video block associated with the current block for storage in the buffer 1113.

After reconstruction unit 1112 reconstructs the video block, loop filtering operation may be performed to reduce video blocking artifacts in the video block.

Entropy encoding unit 1114 may receive data from other functional components of the video encoder 1100. When entropy encoding unit 1114 receives the data, entropy encoding unit 1114 may perform one or more entropy encoding operations to generate entropy encoded data and output a bitstream that includes the entropy encoded data.

Figure 12:
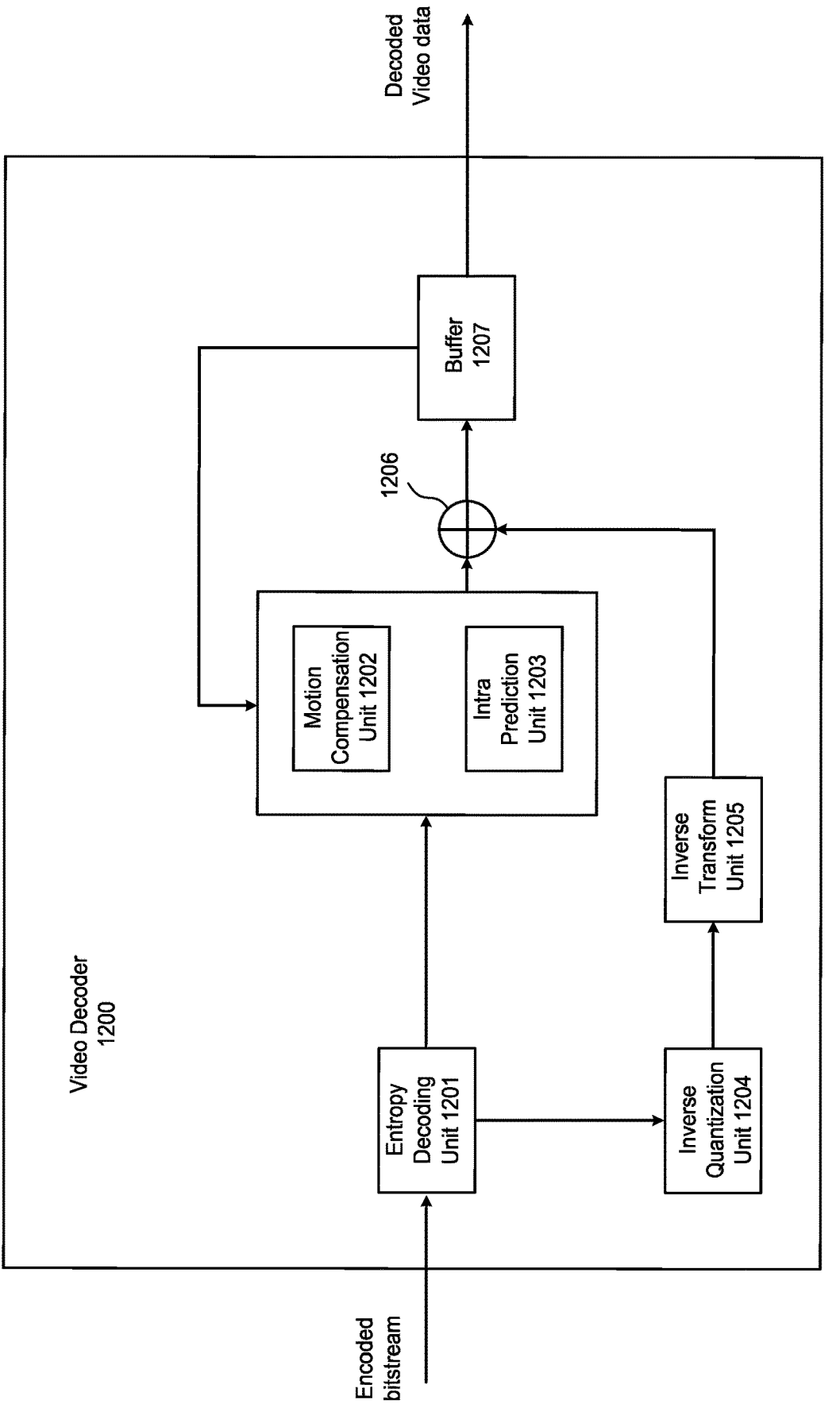
FIG. 12 is a block diagram illustrating an example of video decoder.

FIG. 12 is a block diagram illustrating an example of video decoder 1200, which may be video decoder 1024 in the video coding system 1000 illustrated in FIG. 10.

The video decoder 1200 may be configured to perform any or all of the techniques of this disclosure. In the example of FIG. 12, the video decoder 1200 includes a plurality of functional components. The techniques described in this disclosure may be shared among the various components of the video decoder 1200. In some examples, a processor may be configured to perform any or all of the techniques described in this disclosure.

In the example of FIG. 12, video decoder 1200 includes an entropy decoding unit 1201, a motion compensation unit 1202, an intra prediction unit 1203, an inverse quantization unit 1204, an inverse transformation unit 1205, a reconstruction unit 1206, and a buffer 1207. Video decoder 1200 may, in some examples, perform a decoding pass generally reciprocal to the encoding pass described with respect to video encoder 1014 (FIG. 10).

Entropy decoding unit 1201 may retrieve an encoded bitstream. The encoded bitstream may include entropy coded video data (e.g., encoded blocks of video data). Entropy decoding unit 1201 may decode the entropy coded video data, and from the entropy decoded video data, motion compensation unit 1202 may determine motion information including motion vectors, motion vector precision, reference picture list indexes, and other motion information. Motion compensation unit 1202 may, for example, determine such information by performing the AMVP and merge mode signaling.

Motion compensation unit 1202 may produce motion compensated blocks, possibly performing interpolation based on interpolation filters. Identifiers for interpolation filters to be used with sub-pixel precision may be included in the syntax elements.

Motion compensation unit 1202 may use interpolation filters as used by video encoder 1014 during encoding of the video block to calculate interpolated values for sub-integer pixels of a reference block. Motion compensation unit 1202 may determine the interpolation filters used by video encoder 1014 according to received syntax information and use the interpolation filters to produce predictive blocks.

Motion compensation unit 1202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1203 may use intra prediction modes for example received in the bitstream to form a prediction block from spatially adjacent blocks. Inverse quantization unit 1204 inverse quantizes, i.e., de-quantizes, the quantized video block coefficients provided in the bitstream and decoded by entropy decoding unit 1201. Inverse transform unit 1205 applies an inverse transform.

Reconstruction unit 1206 may sum the residual blocks with the corresponding prediction blocks generated by motion compensation unit 1202 or intra-prediction unit 1203 to form decoded blocks. If desired, a deblocking filter may also be applied to filter the decoded blocks in order to remove blockiness artifacts. The decoded video blocks are then stored in buffer 1207, which provides reference blocks for subsequent motion compensation/intra prediction and also produces decoded video for presentation on a display device.

A listing of solutions preferred by some embodiments is provided next.

The following solutions show example embodiments of techniques discussed in the present disclosure.

The following solutions show example embodiments of techniques discussed in the previous section (e.g., item 1, above).

1. A method of video processing, comprising: determining, based on a maximum allowed padding length, a range to which motion vectors of a block of video are clipped for a conversion between the video and a bitstream of the video; and performing the conversion based on the determining.

2. The method of solution 1, wherein the motion vector is clipped such that a reference picture identified by the motion vector does not require to exceed a larger picture boundary according to a padding length.

3. The method of solution 1, wherein the motion vector is clipped such that the motion vector does not use samples outside a larger picture boundary according to a padding length.

4. The method of any of solutions 1-3, wherein the block is coded using an intra or an inter prediction mode.

5. The method of any of solutions 1-3, wherein the block is coded using an intra block copy mode.

6. A method of video processing, comprising: determining, for a conversion between a video unit of a video and a bitstream of the video, to use a second padding for generating padded samples outside the video unit in addition to a first padding method, regardless of a coding mode for the video unit; and performing the conversion based on the determining.

7. The method of solution 6, wherein the first padding method is first applied to fill a first extended region, followed by the second padding method to fill a second extended region, wherein the second extended region is farther from the video unit than the first extended region.

8. The method of solution 6, wherein the second padding method is a duplicative padding method in nearest available samples generated by the first padding method are directly copied in the second extended region.

9. The method of solution 6, wherein the second padding method is always applied.

10. The method of solution 6, wherein the coding mode is inter mode or intra mode.

11. The method of solution 6, wherein the coding mode is intra-block copy mode.

12. The method of any of solutions 6-8, wherein the duplicative padding is used for samples to left, right, top, bottom, top-left, top-right, bottom-left and bottom-right of the video unit.

13. A method of video processing, comprising: determining, for a conversion between a video unit of a video and a bitstream of the video, whether or how to use predicted samples or predicted blocks for generating padded samples of the video unit according to a rule; and performing the conversion based on the determining.

14. The method of solution 13, wherein the generating padded samples is performed on a block-basis, wherein each block is M×N samples, where M and N are integers.

15. The method of solution 14, wherein M=2 or M=4 or N=2 or N=4.

16. The method of any of claims 13-15, wherein the rule specifies whether predicted samples or blocks are used depending on locations of the predicted samples or blocks.

17. The method of any of solutions 13-16, wherein the rule specifies whether predicted samples or blocks are used depending on values of motion vectors of samples or blocks of the video unit.

18. The method of solution 17, wherein the predicted samples are outside a top boundary, and the rule depends on a vertical component of motion vector of the video unit.

19. The method of solution 17, wherein the predicted samples are outside a bottom boundary, and the rule depends on a vertical component of motion vector of the video unit.

20. The method of solution 17, wherein the predicted samples are outside a left boundary, and the rule depends on a horizontal component of motion vector of the video unit.

21. The method of solution 17, wherein the predicted samples are outside a right boundary, and the rule depends on a horizontal component of motion vector of the video unit.

22. The method of any of solutions 1-21, wherein the video unit corresponds to a video picture.

23. The method of any of solutions 1-22, wherein the conversion included generating the video from the bitstream.

24. The method of any of solutions 1-23, wherein the conversion includes generating the bitstreams from the video.

25. A video decoding apparatus comprising a processor configured to implement a method recited in one or more of solutions 1 to 23.

26. A video encoding apparatus comprising a processor configured to implement a method recited in one or more of solutions 1 to 24.

27. A computer program product having computer code stored thereon, the code, when executed by a processor, causes the processor to implement a method recited in any of solutions 1 to 24.

28. A computer readable medium on which a bitstream complying to a bitstream format that is generated according to any of solutions 1 to 24.

29. A method comprising generating a bitstream according to a method recited in any of solutions 1 to 24 and writing the bitstream to a computer readable medium.

30. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
generating, during a conversion between a first block of a video and a bitstream of the video, a motion vector that points to a first picture, wherein an extended area of the first picture is filled with padding samples;
clipping the motion vector of the first block to be within a motion vector range based on a maximum allowed padding dimension of the extended area of the first picture; and
performing the conversion based on the clipped motion vector,
wherein a prediction block of the first block is derived from the first picture; and
wherein the extended area is filled on a block by block basis, and is avoided to be filled on a sample by sample basis.

2. The method of claim 1, wherein the motion vector is clipped when the motion vector of the first block points to a block which locates outside the first picture.

3. The method of claim 1, wherein the extended area is filled with predicted samples generated by an inter prediction mode, an intra prediction mode, or an intra block copy (IBC) mode.

4. The method of claim 3, wherein the extended area of the first picture defines extended boundaries for the first picture, and the motion vector as clipped points to a second block which locates within the extended boundaries of the first picture.

5. The method of claim 4, wherein the first picture and the extended area collectively form a boundary-extended picture, and wherein a size of the boundary-extended picture is dependent upon a size of the first picture, a vertical padding dimension and a horizontal padding dimension of the extended area.

6. The method of claim 4, wherein all motion vectors used for a motion compensation are within the extended boundaries of the first picture.

7. The method of claim 5, wherein motion vectors used to derive the padded samples during a motion compensated picture boundary padding process are clipped based on the size of the boundary-extended picture.

8. The method of claim 7, wherein the motion vectors are clipped so that corresponding predicted blocks locate within the extended boundaries of the first picture.

9. The method of claim 7, wherein the motion vectors are clipped so that no sample exceeding the extended boundaries of the first picture is fetched for the motion compensation of the predicted block.

10. The method of claim 1, wherein each block used for the block by block basis has a size of M×N, and wherein M and N represent two or more luma samples, where M and N are positive integers.

11. The method of claim 10, wherein N=2 or M=2 or N=4 or M=4 in luma samples.

12. The method of claim 10, wherein each block used for the block by block basis has a minimum motion-compensated padding unit size of M×N, where M and N are positive integers.

13. The method of claim 1, wherein the conversion includes encoding the video into the bitstream.

14. The method of claim 1, wherein the conversion includes decoding the video from the bitstream.

15. An apparatus for processing video data comprising a processor and a non-transitory memory with instructions thereon, wherein the instructions upon execution by the processor, cause the processor to:
generate, during a conversion between a first block of a video and a bitstream of the video, a motion vector that points to a first picture, wherein an extended area of the first picture is filled with padding samples;
clip the motion vector of the first block to be within a motion vector range based on a maximum allowed padding dimension of the extended area of the first picture; and
perform the conversion based on the clipped motion vector,
wherein a prediction block of the first block is derived from the first picture; and
wherein the extended area is filled on a block by block basis, and is avoided to be filled on a sample by sample basis.

16. The apparatus of claim 15, wherein the extended area is filled with predicted samples generated by an inter prediction mode, an intra prediction mode, or an intra block copy (IBC) mode.

17. The apparatus of claim 16, wherein the extended area of the first picture defines extended boundaries for the first picture, and the motion vector as clipped points to a second block which locates within the extended boundaries of the first picture.

18. The apparatus of claim 17, wherein the first picture and the extended area collectively form a boundary-extended picture, and wherein a size of the boundary-extended picture is dependent upon a size of the first picture, a vertical padding dimension and a horizontal padding dimension of the extended area.

19. A non-transitory computer-readable storage medium storing instructions that cause a processor to:
generate, during a conversion between a first block of a video and a bitstream of the video, a motion vector that points to a first picture, wherein an extended area of the first picture is filled with padding samples;
clip the motion vector of the first block to be within a motion vector range based on a maximum allowed padding dimension of the extended area of the first picture; and
perform the conversion based on the clipped motion vector, wherein a prediction block of the first block is derived from the first picture; and wherein the extended area is filled on a block by block basis, and is avoided to be filled on a sample by sample basis.

20. A method of storing a bitstream of a video, comprising:

generating, for a first block of a video, a motion vector that points to a first picture, wherein an extended area of the first picture is filled with padding samples;

clipping the motion vector of the first block to be within a motion vector range, wherein the motion vector range is based on a maximum allowed padding dimension of the extended area of the first picture;

generating the bitstream based on the clipped motion vector, and storing the bitstream in a non-transitory computer-readable recording medium, wherein a prediction block of the first block is derived from the first picture; and wherein the extended area is filled on a block by block basis, and is avoided to be filled on a sample by sample basis.

\* \* \* \* \*